(12) United States Patent
Yasugi et al.

(10) Patent No.: US 11,044,490 B2
(45) Date of Patent: Jun. 22, 2021

(54) MOTION COMPENSATION FILTER APPARATUS, IMAGE DECODING APPARATUS, AND VIDEO CODING APPARATUS

(71) Applicants: SHARP KABUSHIKI KAISHA, Sakai (JP); FG INNOVATION COMPANY LIMITED, Tuen Mun (HK)

(72) Inventors: Yukinobu Yasugi, Sakai (JP); Tomohiro Ikai, Sakai (JP); Takeshi Chujoh, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/649,616

(22) PCT Filed: Sep. 21, 2018

(86) PCT No.: PCT/JP2018/035195
§ 371 (c)(1),
(2) Date: Mar. 20, 2020

(87) PCT Pub. No.: WO2019/065537
PCT Pub. Date: Apr. 4, 2019

(65) Prior Publication Data
US 2020/0296404 A1    Sep. 17, 2020

(30) Foreign Application Priority Data

Sep. 28, 2017 (JP) .............................. JP2017-189062

(51) Int. Cl.
*H04N 19/513*    (2014.01)
*H04N 19/80*    (2014.01)

(52) U.S. Cl.
CPC .......... *H04N 19/513* (2014.11); *H04N 19/80* (2014.11)

(58) Field of Classification Search
None
See application file for complete search history.

(56) References Cited

U.S. PATENT DOCUMENTS

| 2009/0003441 A1* | 1/2009 | Sekiguchi | H04N 19/147 375/240.13 |
| 2012/0300849 A1* | 11/2012 | Yasugi | H04N 19/61 375/240.16 |
| 2013/0170554 A1* | 7/2013 | Matsuo | H04N 19/117 375/240.16 |

(Continued)

OTHER PUBLICATIONS

Shohei Matsuo et al.: "CE3: LCU-based adaptive interpolation filter", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G258_r1.

(Continued)

*Primary Examiner* — Talha M Nawaz
(74) *Attorney, Agent, or Firm* — ScienBiziP, P.C.

(57) ABSTRACT

To suppress an overhead of a flag indicating a motion compensation filter. A motion compensation filter apparatus includes a motion compensation filter unit configured to switch a filter to apply on a full sample image in a certain unit, and an MC filter parameter derivation unit configured to select a switching unit for filter switching by the motion compensation filter unit.

11 Claims, 22 Drawing Sheets

(56) References Cited

U.S. PATENT DOCUMENTS

| | | | | |
|---|---|---|---|---|
| 2013/0301704 A1* | 11/2013 | Srinivasan | ........... | H04N 19/115 |
| | | | | 375/240.02 |
| 2014/0247875 A1* | 9/2014 | Hattori | ................ | H04N 19/176 |
| | | | | 375/240.12 |
| 2016/0094860 A1* | 3/2016 | Minezawa | ........... | H04N 19/159 |
| | | | | 375/240.12 |

OTHER PUBLICATIONS

Jianle Chen et al.: "Algorithm Description of Joint Exploration Test Model 5 (JEM 5)", Joint Video Exploration Team (JVET) of ITU-T SG 16 WP 3 and ISO/IEC JTC 1/SC 29/WG 11, 5th Meeting: Geneva, CH, Jan. 12-20, 2017, JVET-E1001-v2.

\* cited by examiner (a)

| PHASE | COEFFICIENT | | | | | | | |
|---|---|---|---|---|---|---|---|---|
| 0 | 0 | 0 | 0 | 64 | 0 | 0 | 0 | 0 |
| 1/16 | 0 | 1 | -3 | 63 | 4 | -2 | 1 | 0 |
| 2/16 | -1 | 2 | -5 | 62 | 8 | -3 | 1 | 0 |
| 3/16 | -1 | 3 | -8 | 60 | 13 | -4 | 1 | 0 |
| 4/16 | -1 | 4 | -10 | 58 | 17 | -5 | 1 | 0 |
| 5/16 | -1 | 4 | -11 | 52 | 26 | -8 | 3 | -1 |
| 6/16 | -1 | 3 | -9 | 47 | 31 | -10 | 4 | -1 |
| 7/16 | -1 | 4 | -11 | 45 | 34 | -10 | 4 | -1 |
| 8/16 | -1 | 4 | -11 | 40 | 40 | -11 | 4 | -1 |
| 9/16 | -1 | 4 | -10 | 34 | 45 | -11 | 4 | -1 |
| 10/16 | -1 | 4 | -10 | 31 | 47 | -9 | 3 | -1 |
| 11/16 | -1 | 3 | -8 | 26 | 52 | -11 | 4 | -1 |
| 12/16 | 0 | 1 | -5 | 17 | 58 | -10 | 4 | -1 |
| 13/16 | 0 | 1 | -4 | 13 | 60 | -8 | 3 | -1 |
| 14/16 | 0 | 1 | -3 | 8 | 62 | -5 | 2 | -1 |
| 15/16 | 0 | 1 | -2 | 4 | 63 | -3 | 1 | 0 |

(b)

| PHASE | COEFFICIENT | | | |
|---|---|---|---|---|
| 0 | 0 | 64 | 0 | 0 |
| 1/32 | -1 | 63 | 2 | 0 |
| 2/32 | -2 | 62 | 4 | 0 |
| 3/32 | -2 | 60 | 7 | -1 |
| 4/32 | -2 | 58 | 10 | -2 |
| 5/32 | -3 | 57 | 12 | -2 |
| 6/32 | -4 | 56 | 14 | -2 |
| 7/32 | -4 | 55 | 15 | -2 |
| 8/32 | -4 | 54 | 16 | -2 |
| 9/32 | -5 | 53 | 18 | -2 |
| 10/32 | -6 | 52 | 20 | -2 |
| 11/32 | -6 | 49 | 24 | -3 |
| 12/32 | -6 | 46 | 28 | -4 |
| 13/32 | -5 | 44 | 29 | -4 |
| 14/32 | -4 | 42 | 30 | -4 |
| 15/32 | -4 | 39 | 33 | -4 |
| 16/32 | -4 | 36 | 36 | -4 |
| 17/32 | -4 | 33 | 39 | -4 |
| 18/32 | -4 | 30 | 42 | -4 |
| 19/32 | -4 | 29 | 44 | -5 |
| 20/32 | -4 | 28 | 46 | -6 |
| 21/32 | -3 | 24 | 49 | -6 |
| 22/32 | -2 | 20 | 52 | -6 |
| 23/32 | -2 | 18 | 53 | -5 |
| 24/32 | -2 | 16 | 54 | -4 |
| 25/32 | -2 | 15 | 55 | -4 |
| 26/32 | -2 | 14 | 56 | -4 |
| 27/32 | -2 | 12 | 57 | -3 |
| 28/32 | -2 | 10 | 58 | -2 |
| 29/32 | -1 | 7 | 60 | -2 |
| 30/32 | 0 | 4 | 62 | -2 |
| 31/32 | 0 | 2 | 63 | -1 |

FIG. 14 mc_filter_set_idx=    0         1           2           3

NUMBER OF MC FILTERS   | N=1,  | | N=2,    | | N=2,    | | N=3,    |
           MC FILTER   | filterA| | filterA | | filterA | | filterA |
                                 | filterB |   | filterC |   | filterB |
                                                              | filterC |

FIG. 15

| block_filter_idx | mc_filter_type[i] |
|---|---|
| 0 | filterA |
| 1 | filterB |
| 2 | filterC |

FIG. 16

| (a) | (DCT-IF) | PHASE | COEFFICIENT | | | | | | | |
|---|---|---|---|---|---|---|---|---|---|---|
| | | 0/8 | 0 | 0 | 0 | 64 | 0 | 0 | 0 | 0 |
| | | 1/8 | -1 | 2 | -6 | 62 | 9 | -3 | 1 | 0 |
| | | 2/8 | -1 | 4 | -10 | 57 | 18 | -6 | 2 | 0 |
| | | 3/8 | -1 | 4 | -11 | 50 | 29 | -9 | 3 | -1 |
| | | 4/8 | -1 | 4 | -11 | 40 | 40 | -11 | 4 | -1 |
| | | 5/8 | -1 | 3 | -9 | 29 | 50 | -11 | 4 | -1 |
| | | 6/8 | 0 | 2 | -6 | 18 | 57 | -10 | 4 | -1 |
| | | 7/8 | 0 | 1 | -3 | 9 | 62 | -6 | 2 | -1 |
| (b) | (MaxFlat) | PHASE | COEFFICIENT | | | | | | | |
| | | 0/8 | 0 | 0 | 0 | 64 | 0 | 0 | 0 | 0 |
| | | 1/8 | 0 | 1 | -5 | 61 | 9 | -3 | 1 | 0 |
| | | 2/8 | -1 | 2 | -8 | 56 | 19 | -6 | 2 | 0 |
| | | 3/8 | -1 | 3 | -9 | 48 | 29 | -8 | 3 | -1 |
| | | 4/8 | -1 | 3 | -9 | 39 | 39 | -9 | 3 | -1 |
| | | 5/8 | -1 | 3 | -8 | 29 | 48 | -9 | 3 | -1 |
| | | 6/8 | 0 | 2 | -6 | 19 | 56 | -8 | 2 | -1 |
| | | 7/8 | 0 | 1 | -3 | 9 | 61 | -5 | 1 | 0 |
| (c) | (Lanczos) | PHASE | COEFFICIENT | | | | | | | |
| | | 0/8 | 0 | 0 | 0 | 64 | 0 | 0 | 0 | 0 |
| | | 1/8 | 0 | 2 | -6 | 62 | 8 | -3 | 1 | 0 |
| | | 2/8 | -1 | 4 | -10 | 57 | 18 | -6 | 2 | 0 |
| | | 3/8 | -1 | 4 | -11 | 49 | 29 | -9 | 3 | 0 |
| | | 4/8 | -1 | 4 | -11 | 40 | 40 | -11 | 4 | -1 |
| | | 5/8 | 0 | 3 | -9 | 29 | 49 | -11 | 4 | -1 |
| | | 6/8 | 0 | 2 | -6 | 18 | 57 | -10 | 4 | -1 |
| | | 7/8 | 0 | 1 | -3 | 8 | 62 | -6 | 2 | 0 |

FIG. 22

MOTION COMPENSATION FILTER APPARATUS, IMAGE DECODING APPARATUS, AND VIDEO CODING APPARATUS

TECHNICAL FIELD

An aspect of the disclosure relates to a motion compensation filter apparatus, an image decoding apparatus, and an image coding apparatus.

BACKGROUND ART

A video coding apparatus which generates coded data by coding a video, and a video decoding apparatus which generates decoded images by decoding the coded data are used to transmit or record a video efficiently, Specific examples of a video coding scheme include schemes proposed in H.264/AVC or High-Efficiency Video Coding (HEVC), for example.

In such a video coding scheme, images (pictures) constituting a video are managed by a hierarchy structure including slices obtained by splitting images, Coding Tree Units (CTUs) obtained by splitting slices, units of coding (also referred to as Coding Units (CUs)) obtained by splitting coding tree units, prediction units (PUs) which are blocks obtained by splitting coding units, and transform units (TUs), and are coded/decoded for each CU.

In such a video coding scheme, usually, a prediction image is generated based on local decoded images obtained by coding/decoding input images, and prediction residual (also sometimes referred to as "difference images" or "residual images") obtained by subtracting the prediction images from input images (original image) are coded. Generation methods of prediction images include an inter-picture prediction (an inter prediction) and an intra-picture prediction (intra prediction).

An example of a technique of recent video coding and decoding is described in NPL 1.

CITATION LIST

Non Patent Literature

NPL 1: "Algorithm Description of Joint Exploration Test Model 5", JVET-E1001, Joint Video Exploration Team (JVET) of ITU-T SG 16 WP 3 and ISO/IEC JTC 1/SC 29/WG 11, 12-20 Jan. 2017

SUMMARY

Technical Problem

In the technique of recent video coding and decoding, motion compensation filters have been used in motion compensation processing in generating prediction images. On the other hand, in a case that filter processing is performed by switching the motion compensation filter in units of a block, there is a problem in that the overhead of a flag indicating the motion compensation filter of each block is increased. The disclosure is to provide a motion compensation filter apparatus, an image decoding apparatus, and an image coding apparatus that can solve the above-described problems.

Solution to Problem

In order to solve the above problem, a motion compensation filter apparatus according to an aspect of the disclosure is a motion compensation filter apparatus for applying on a pixel value of a full sample image at an integer pixel position and calculating a pixel value at a fractional pixel position, to generate a filtered image, the motion compensation filter apparatus including: a filter switching processing unit configured to switch a filter to apply on the full sample image in a certain unit; and a filter switching unit selection unit configured to select a switching unit for filter switching by the filter switching processing unit.

Advantageous Effects of Invention

According to the configuration above, an overhead of a flag indicating a type of a motion compensation filter adaptive to each block can be suppressed.

BRIEF DESCRIPTION OF DRAWINGS

FIG. 14 is a diagram, of which (a) and (b) each illustrate an example of an MC filter according to the present embodiment.

FIG. 15 is a diagram illustrating an example of a filter setting mode number according to the present embodiment.

FIG. 16 is a diagram illustrating an example of a filer index according to the present embodiment.

FIG. 22 is a diagram illustrating another example of the MC filter according to the present embodiment.

DESCRIPTION OF EMBODIMENTS

First Embodiment

Hereinafter, embodiments of the disclosure are described with reference to the drawings.

Figure 21:
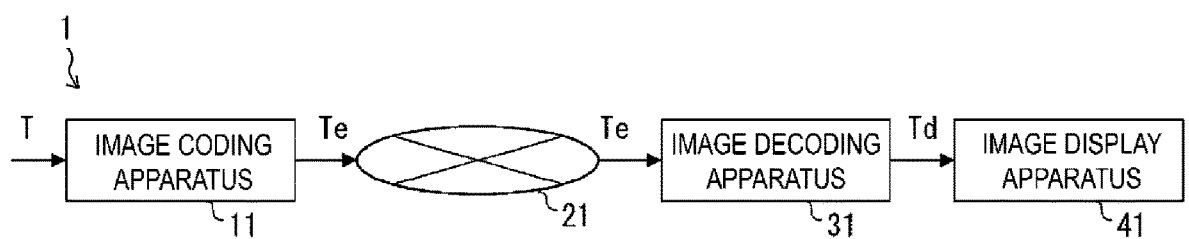
FIG. 21 is a schematic diagram illustrating a configuration of an image transmission system according to the present embodiment.

FIG. 21 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image coding apparatus (video coding apparatus) 11, a network 21, an image decoding apparatus (video decoding apparatus) 31, and an image display apparatus 41, An image T indicating an image of a single layer or multiple layers is input to the image coding apparatus 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction, in a case of (simulcast), coded data can be compiled.

The network 21 transmits a coding stream Te generated by the image coding apparatus 11 to the image decoding apparatus 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The image decoding apparatus 31 decodes each of the coding streams Te transmitted by the network 21, and generates one or multiple decoded images Td.

The image display apparatus 41 displays all or part of one or multiple decoded images Td generated by the image decoding apparatus 31. For example, the image display apparatus 41 includes a display device such as a liquid crystal display and an organic Electro-luminescence (EL) display. In spatial scalable coding and SNR scalable coding, in a case that the image decoding apparatus 31 and the image display apparatus 41 have high processing capability, an enhanced layer image having high image quality is displayed, and in a case of having lower processing capability, a base layer image which does not require as high processing capability and display capability as an enhanced layer is displayed.

Operator

Operators used herein will be described below.

An operator ">>" is a right bit shift operator, "<<" is a left bit shift operator, "&" is a bitwise AND operator, "|" is a bitwise OR operator, "~" is a bitwise NOT operator, and "|=" is an OR assignment operator.

An operator "x ? y: z" is a ternary operator representing that y is obtained in case that x is true (that is, other than "0") or z is obtained in a case that x is false (that is, "0").

Clip3 (a, b, c) is a function to clip c in a value equal to or greater than a and equal to or less than 1), and a function to return a in a case that c is less than a (c<a), return b in a case that c is greater than b (c>b), and return c otherwise (however, a is equal to or less than b (a<=b)).

Structure of Coding Stream Te

Prior to the detailed description of the image coding apparatus 11 and the image decoding apparatus 31 according to the present embodiment, the data structure of the coding stream Te generated by the image coding apparatus 11 and decoded by the image decoding apparatus 31 will be described.

Figure 1:
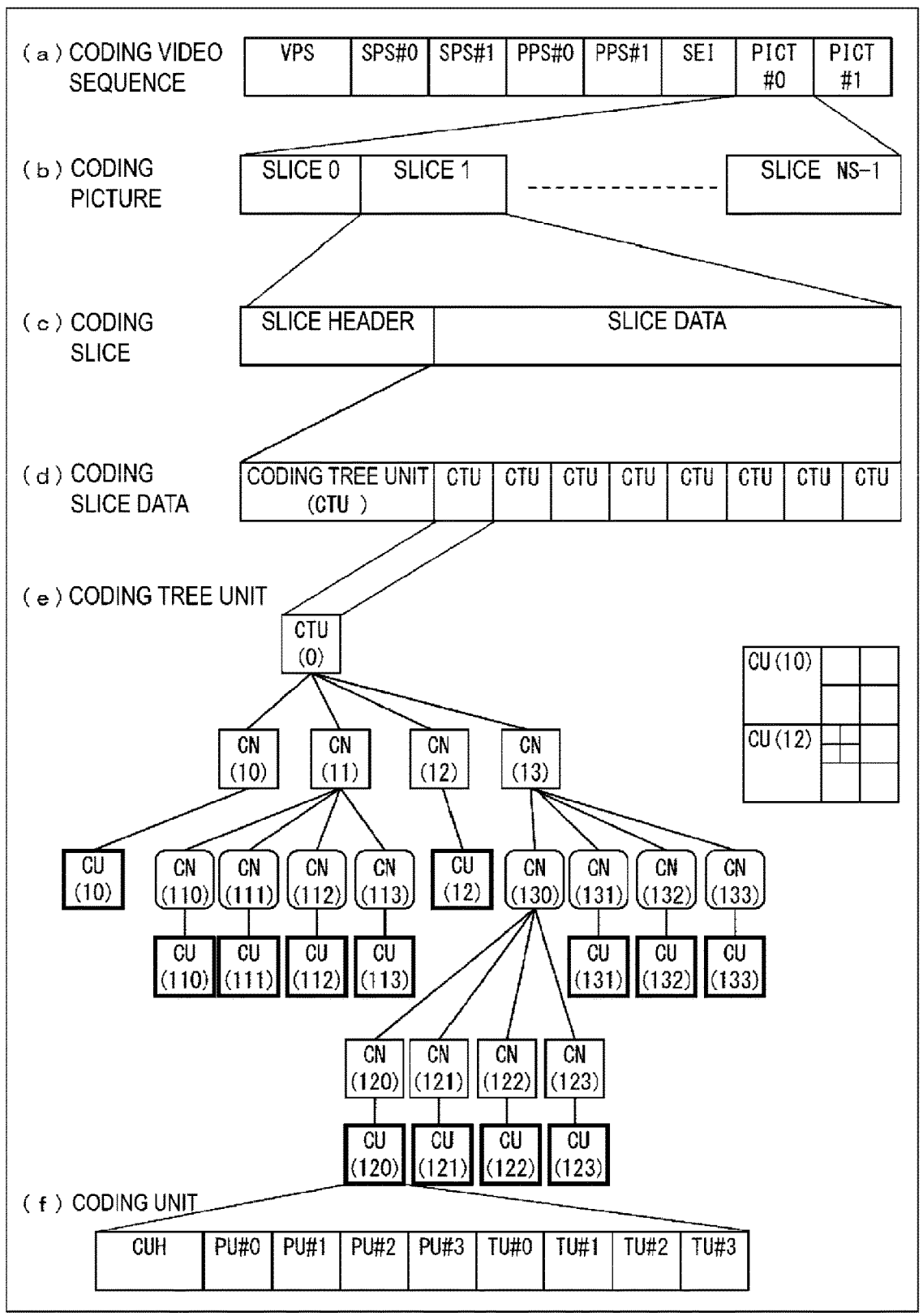
FIG. 1 is a diagram illustrating a hierarchy structure of data of a coding stream according to the present embodiment.

FIG. 1 is a diagram illustrating a hierarchy structure of data in the coding stream Te. The coding stream Te includes a sequence and multiple pictures constituting a sequence illustratively. (a) to (f) of FIG. 1 are diagrams illustrating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referenced by the image decoding apparatus 31 to decode the sequence SEQ of a processing target is prescribed. As illustrated in (a) of FIG. 1, the sequence SEQ includes a Video Parameter Set, a Sequence Parameter Set SPS, a Picture Parameter Set PPS, a picture PICT, and Supplemental Enhancement information SEI. Here, a value indicated after # indicates a layer ID. In FIG. 1, although an example is illustrated where coded data of #0 and #1, in other words, layer 0 and layer 1 exist, types of layers and the number of layers do not depend on this.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referenced by the image decoding apparatus 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referenced by the image decoding apparatus 31 to decode each picture in a target sequence is prescribed. For example, a reference value (pic_init_qp_minus26) of a quantization step size used for decoding of a picture and a flag (weighted_pred_flag) indicating an application of a weighted prediction are included, Note that multiple PPSs may exist, In that case, any of multiple PPSs is selected from each picture in a target sequence.

Coding Picture

In the coding picture, a set of data referenced by the image decoding apparatus 31 to decode the picture PICT of a processing target is prescribed. As illustrated in (b) of FIG. 1, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted and described. The same applies to other data included in the coding stream Te described below and described with an added subscript.

Coding Slice

In the coding slice, a set of data referenced by the image decoding apparatus 31 to decode the slice S of a processing target is prescribed. As illustrated in (c) of FIG. 1, the slice S includes a slice header SH and a slice data SDATA.

The slice header SH includes a coding parameter group referenced by the image decoding apparatus 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In the coding slice data, a set of data referenced by the image decoding apparatus 31 to decode the slice data SDATA of a processing target is prescribed. As illustrated in (d) of FIG. 1, the slice data SDATA includes Coding Tree Units (CTUs). The CTU is a block of a fixed size (for example, 64×64) constituting a slice, and may be referred to as a Largest Coding Unit (LCU).

Coding Tree Unit

As illustrated in (e) of FIG. 1, a set of data referenced by the image decoding apparatus 31 to decode a coding tree unit of a processing target is prescribed. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also prescribed as the highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes, and is not split anymore. The coding unit CU is a basic unit of a coding process.

In a case that the size of the coding tree unit CTU is 64×64 pixels, the size of the coding unit may be any of 64×64 pixels, 32×32 pixels, 16×16 pixels, and 8×8 pixels.

Coding Unit

As illustrated in (f) of FIG. 1, a set of data referenced to by the image decoding apparatus 31 to decode the coding unit of a processing target is prescribed. Specifically, the coding unit includes a prediction tree, a transform tree, and a CU header CUH. In the CU header, a prediction mode, a partition method (PU partition mode), and the like are prescribed.

In the prediction tree, prediction information (a reference picture index, a motion vector, and the like) of each prediction unit (PU) where the coding unit is split into one or multiple is prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further partitioned is referred to as a "subblock". The subblock includes multiple pixels. In a case that the sizes of the prediction unit and the subblock are the same, there is one subblock in the prediction unit. In a case that the prediction unit is larger than the size of the subblock, the prediction unit is partitioned into subblocks. For example, in a case that the prediction unit is 8×8, and the subblock is 4×4, the prediction unit is partitioned into four subblocks formed by being horizontally partitioned into two and vertically partitioned into two.

The prediction process may be performed for each of these prediction units (subblocks).

Generally speaking, there are two types of partitions in the prediction tree, including a case of an intra prediction and a case of an inter prediction. The intra prediction is a prediction in an identical picture, and the inter prediction refers to a prediction process performed between mutually different pictures (for example, between display times, and between layer images).

In a case of the intra prediction, the partition method includes 2N×2N (the same size as the coding unit) and N×N.

In a case of the inter prediction, the partition method includes coding by a PU partition mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry partition of 1:3 and 3:1. The PUs included in the CU are expressed as PU0, PU1, PU2, and pu3 sequentially.

Figure 2:
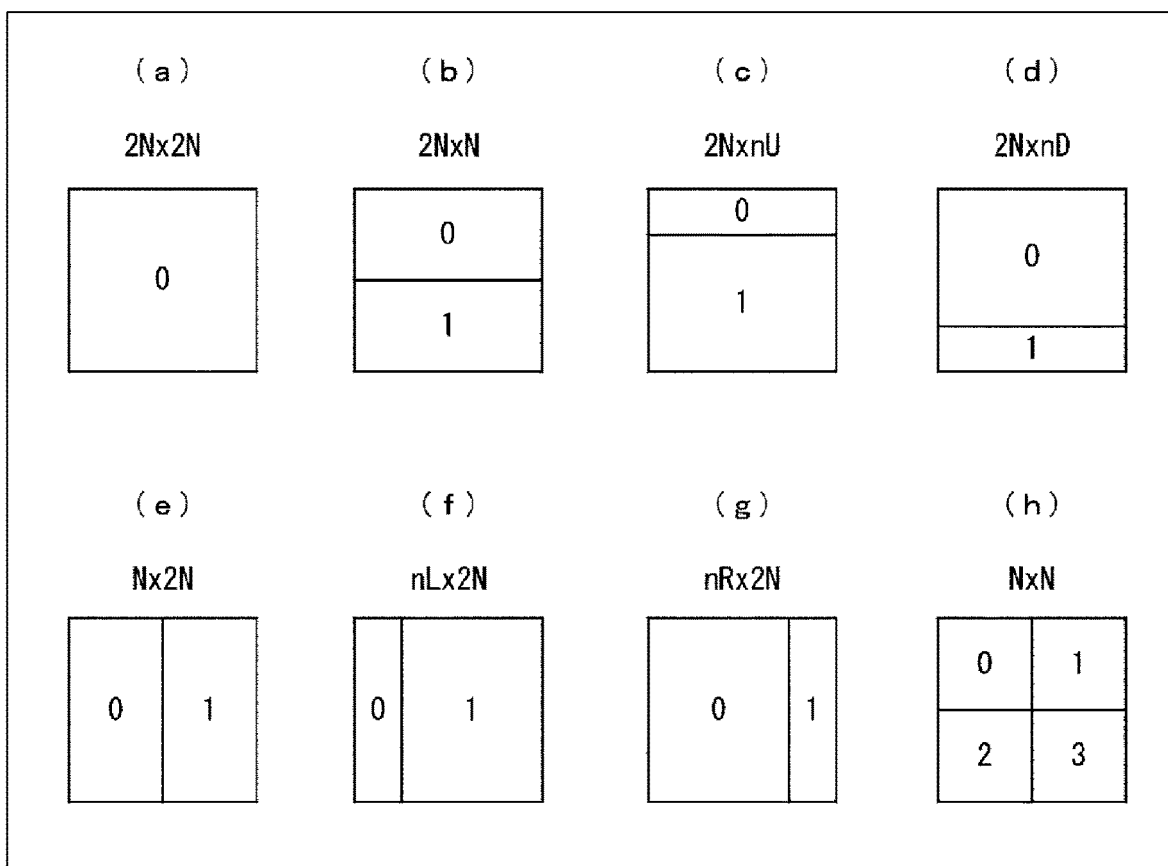
FIG. 2 is a diagram illustrating patterns for PU partition modes. (a) to (h) illustrate partition shapes in cases that PU partition modes are 2N×2N, 2N×N, 2N×nU, 2N×nD, N×2N, nL×2N, nR×2N, and N×N, respectively.

(a) to (h) of FIG. 2 illustrate shapes of partitions in respective PU partition modes (positions of borders of PU partition) specifically. (a) of FIG. 2 illustrates a partition of 2N×2N, and (b), (c), and (d) of FIG. 2 illustrate partitions (horizontally long partitions) of 2N×N, 2N×nU, and 2N×nD, respectively. (e), (f), and (g) of FIG. 2 illustrate partitions (vertically long partitions) in cases of N×2N, nL×2N, and nR×2N, respectively, and (h) of FIG. 2 illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and a position and a size of each transform unit are prescribed. In another expression, the transform unit is one or multiple non-overlapping regions constituting the coding unit. The transform tree includes one or multiple transform units obtained by the above-mentioned split.

Partitions in the transform tree include those to allocate a region that is the same size as the coding unit as a transform unit, and those by recursive quad tree splits similar to the above-mentioned split of CUs.

A transform process is performed for each of these transform units.

Prediction Parameter

A prediction image of Prediction Units (PUs) is derived by prediction parameters related to the PUs. The prediction parameter includes a prediction parameter of an intra prediction or a prediction parameter of an inter prediction. The prediction parameter of an inter prediction (inter prediction parameters) will be described below. The inter prediction parameter include prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters included in a coded data include a PU partition mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 3:
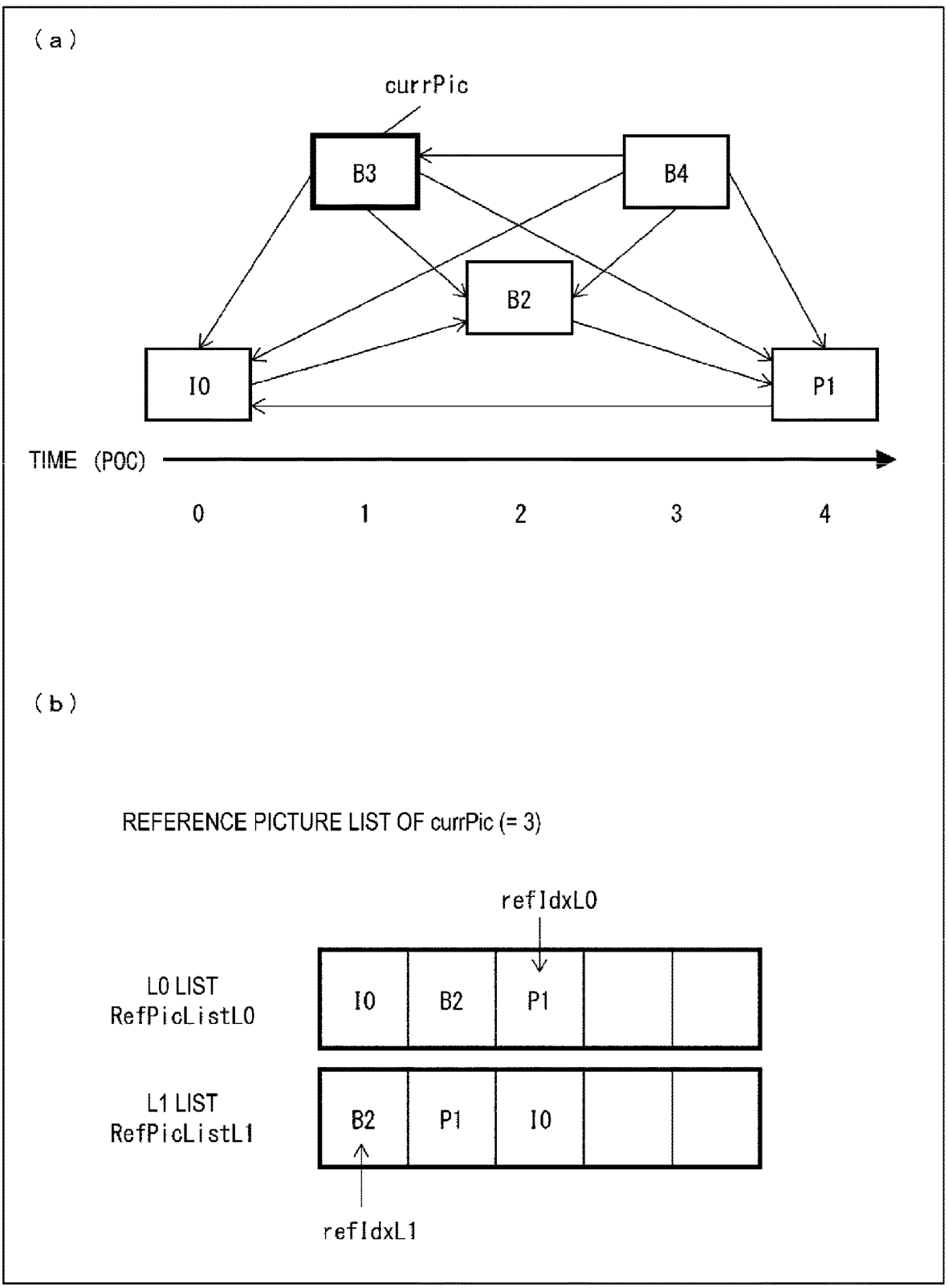
FIG. 3 is a conceptual diagram illustrating examples of reference pictures and reference picture lists.

A reference picture list is a list constituted by reference pictures stored in a reference picture memory 306. FIG. 3 is a conceptual diagram illustrating an example of reference pictures and reference picture lists, In FIG. 3(a), a rectangle represents a picture, an arrow represents a picture reference relationship, an abscissa represents time, characters "I", "P", and "B" in the rectangles represent an intra picture, a uni-prediction picture, and a hi-prediction picture, respectively, and a numeral in the rectangle represents a decoding order. As illustrated, the decoding order of the pictures is I0, P1, B2, B3, and B4, and the display order is I0, B3, B2, B4, and P1. FIG. 3(b) illustrates an example of the reference picture list, The reference picture list is a list to represent a candidate of a reference picture, and one picture (slice) may include one or more reference picture lists, In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. For an individual prediction unit, which picture in a reference picture list RefPicListX is actually referenced is specified with a reference picture index refIdxLX. The diagram indicates an example where reference pictures P1 and B2 are referred to by refIdxL0 and refIdxL1. [0051.]

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these, The merge prediction mode is a mode to use to derive from prediction parameters of neighboring PUs already processed without including a prediction list utilization flag predFlagLX (or an inter prediction indicator inter_pred_idc), a reference picture index refIdxLX, and a motion vector mvLX in a coded data, and the AMVP mode is a mode to include an inter prediction indicator inter_pred_idc, a reference picture index refIdxLX, a motion vector mvLX in a coded data. Note that, the motion vector mvLX is coded as a prediction vector index mvp_LX_idx identifying a prediction vector mvpLX and a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate to uses reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a description method used in a case of not distinguishing the L0 prediction and the L1 prediction, and distinguishes parameters for the L0 list and parameters for the L1 list by replacing LX with L0 and L1.

The merge index merge_idx is an index to indicate to use either prediction parameter as a prediction parameter of a decoding target PU among prediction parameter candidates (merge candidates) derived from PUs of which the processing is completed.

Motion Vector

The motion vector mvLX indicates a gap quantity between blocks in two different pictures. A prediction vector and a difference vector related to the motion vector mvLX is referred to as a prediction vector mvpLX and a difference vector mvdLX respectively.

Inter Prediction Indicator inter_pred_idc and Prediction List Utilization Flag predFlagLX A relationship between an inter prediction indicator inter_pred_idc and prediction list utilization flags predFlagL0 and predFlagL1 are as follows, and those can be converted mutually.

$$\text{inter\_pred\_idc}=(\text{predFlagL1}<<1)+\text{predFlagL0}$$

$$\text{predFlagL0}=\text{inter\_pred\_idc} \ \& \ 1$$

$$\text{predFlagL1}=\text{inter\_pred\_ide}>>1$$

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following equation.

$$\text{biPred}=(\text{predFlagL0}==1 \ \&\& \ \text{predFlagL1}==1)$$

The flag biPred can be also derived from whether an inter prediction indicator is a value indicating to use two prediction lists (reference pictures). For example, the flag can be derived by the following equation.

$$\text{biPred}=(\text{inter\_pred\_idc}==\text{PRED\_BI})? \ 1:0$$

The above equation can be also expressed by the following equation.

$$\text{biPred}=(\text{inter\_pred\_idc}==\text{PRED\_BI})$$

Note that, for example, PRED_BI can use the value of 3.

Configuration of Image Decoding Apparatus

Figure 5:
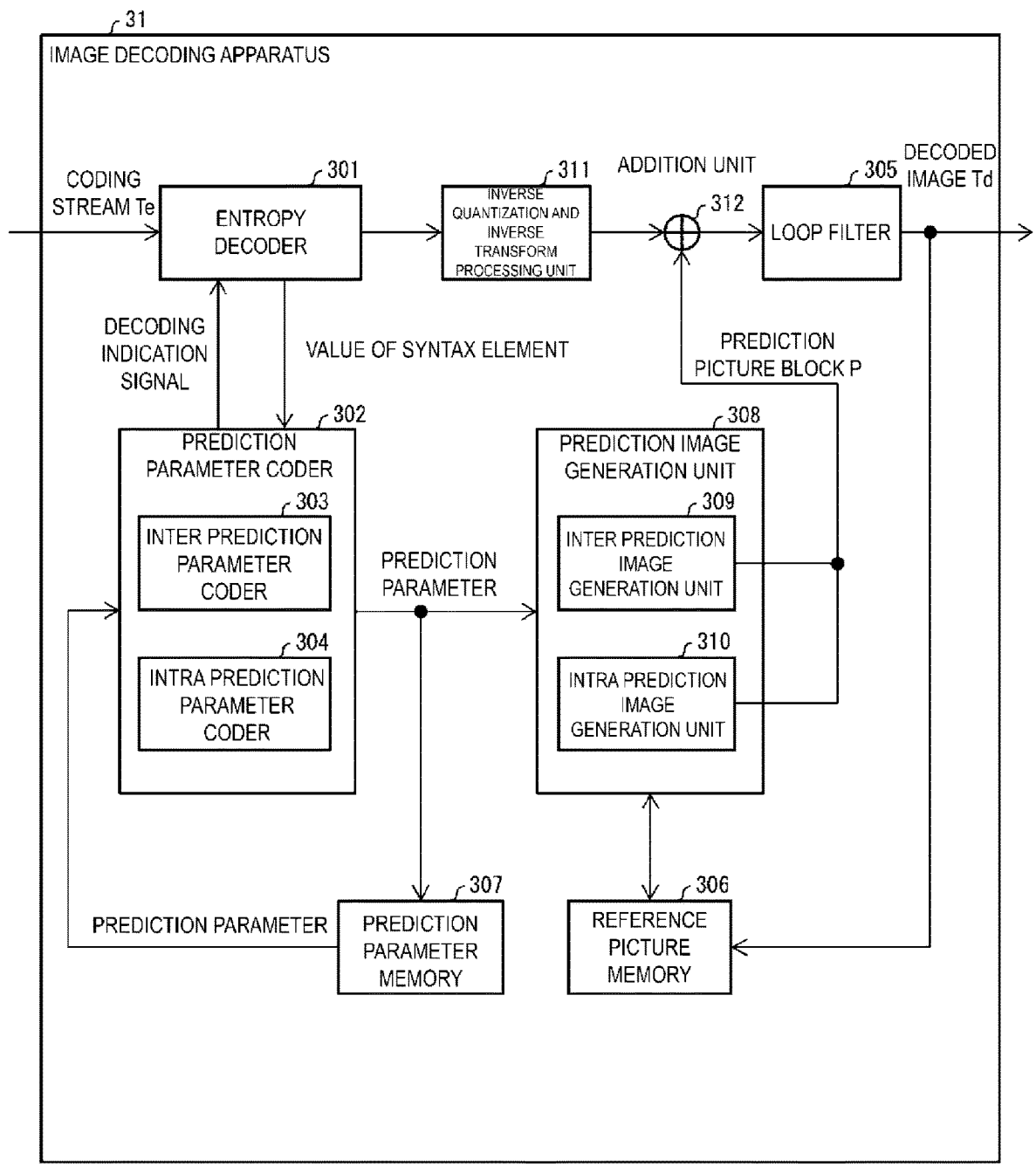
FIG. 5 is a schematic diagram illustrating a configuration of an image decoding apparatus according to the present embodiment.

A configuration of the image decoding apparatus 31 according to the present embodiment will now be described. FIG. 5 is a schematic diagram illustrating a configuration of the image decoding apparatus 31 according to the present embodiment. The image decoding apparatus 31 includes an entropy decoder 301, a prediction parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312.

The prediction parameter decoder 302 includes an inter prediction parameter decoder 303 and an intra prediction parameter decoder 304. The prediction image generation unit 308 includes an inter prediction image generation unit 309 and an intra prediction image generation unit 310.

The entropy decoder 301 performs entropy decoding on the coding stream Te input from the outside, and separates and decodes individual codes (syntax elements). Separated codes include prediction information to generate a prediction image and residual information to generate a difference image and the like.

The entropy decoder 301 outputs some of the separated codes to the prediction parameter decoder 302. Some the separated codes include a prediction mode predMode, a PU partition mode part_mode, a merge flag merge_flag, a merge index merge_idx, an inter prediction index inter_pred_idc, a reference picture index refIdxLX, a prediction vector index mvp_LX_idx, and a difference vector mvdLX. The control of which code to decode is performed based on an indication of the prediction parameter decoder 302. The entropy decoder 301 outputs quantized coefficients to the inverse quantization and inverse transform processing unit 311. These quantized coefficients are coefficients obtained through quantization by performing, on the residual signal, frequency transform such as Discrete Cosine Transform (DCT), Discrete Sine Transform (DST), and Karyhnen Loeve Transform (KLT) in the coding process.

The inter prediction parameter decoder 303 decodes an inter prediction parameter with reference to a prediction parameter stored in the prediction parameter memory 307, based on a code input from the entropy decoder 301.

The inter prediction parameter decoder 303 outputs a decoded inter prediction parameter to the prediction image generation unit 308, and also stores the decoded inter prediction parameter in the prediction parameter memory 307. Details of the inter prediction parameter decoder 303 will be described later.

The intra prediction parameter decoder 304 decodes an intra prediction parameter with reference to a prediction parameter stored in the prediction parameter memory 307, based on a code input from the entropy decoder 301. The intra prediction parameter is a parameter used in a process to predict a CU in one picture, for example, an intra prediction mode IntraPredMode. The intra prediction parameter decoder 304 outputs a decoded intra prediction parameter to the prediction image generation unit 308, and also stores the decoded intra prediction parameter in the prediction parameter memory 307.

The intra prediction parameter decoder 304 may derive different intra prediction modes depending on luminance and chrominance. In this case, the intra prediction parameter decoder 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 35 modes, and corresponds to a planar prediction (0), a DC prediction (1), and directional predictions (2 to 34). The chrominance prediction mode IntraPredModeC uses any of a planar prediction (0), a DC prediction (1), directional predictions (2 to 34), and an LM mode (35). The intra prediction parameter decoder 304 may decode a flag indicating whether IntraPredModeC is a mode same as the luminance mode, assign IntraPredModeY to IntraPredModeC in a case of indicating that the flag is the mode same as the luminance mode, and decode a planar prediction (0), a DC prediction (1), directional predictions (2 to 34), and an LM mode (35) as IntraPredModeC in a case of indicating that the flag is a mode different from the luminance mode.

The loop filter 305 applies a filter such as a deblocking filter, a sample adaptive offset (SAO), and an adaptive loop filter (ALF) on a decoded image of a CU generated by the addition unit 312.

The reference picture memory 306 stores a decoded image of a CU generated by the addition unit 312 in a prescribed position for each picture and CU of a decoding target.

The prediction parameter memory 307 stores a prediction parameter in a prescribed position for each picture and prediction unit (or a subblock, a fixed size block, and a pixel) of a decoding target. Specifically, the prediction parameter memory 307 stores an inter prediction parameter decoded by the inter prediction parameter decoder 303, an intra prediction parameter decoded by the intra prediction parameter decoder 304 and a prediction mode predMode separated by the entropy decoder 301. For example, the inter prediction parameters stored include a prediction list utilization flag predFlagLX (the inter prediction indicator inter_pred_idc), a reference picture index refIdxLX, and a motion vector mvLX.

To the prediction image generation unit 308, a prediction mode predMode input from the entropy decoder 301 is input, and prediction parameters are input from the prediction parameter decoder 302. The prediction image generation unit 308 reads a reference picture from the reference picture memory 306. The prediction image generation unit 308 uses the input prediction parameters and the read out reference picture (reference picture block) to generate a prediction image of the PU or sub-block in the prediction mode indicated by the prediction mode predMode.

Here, in a case that the prediction mode predMode indicates the inter prediction mode, the inter prediction image generation unit 309 uses the inter prediction parameters input from the inter prediction parameter decoder 303 and the read out reference picture (reference picture block) to generate the prediction image of the PU or sub-block by the inter prediction.

For a reference picture list (an L0 list or an L1 list) where a prediction list utilization flag predFlagLX is 1, the inter prediction image generation unit 309 reads a reference picture block from the reference picture memory 306 in a position indicated by a motion vector mvLX, based on a decoding target PU from reference pictures indicated by the reference picture index refIdxLX. The inter prediction image generation unit 309 performs a prediction based on a read reference picture block and generates a prediction image of a PU. The inter prediction image generation unit 309 outputs the generated prediction image of the PU to the addition unit 312. Here, the reference picture block is a set of pixels on the reference picture (called as a block because it generally has a rectangle shape), and is an area referenced in order to generate the prediction image of the PU or sub-block.

In a case that the prediction mode predMode indicates an intra prediction mode, the intra prediction image generation unit 310 performs intra prediction by using an intra prediction parameter input from the intra prediction parameter decoder 304 and a read reference picture. Specifically, the intra prediction image generation unit 310 reads an adjacent PU, which is a picture of a decoding target, in a prescribed range from a decoding target PU among PUs already decoded, from the reference picture memory 306. The prescribed range corresponds to, for example, any of adjacent PUs in left, top left, top, and top right in a case that a decoding target PU moves in order of so-called raster scan sequentially, and varies according to the intra prediction modes. The order of the raster scan is an order to move sequentially from the left edge to the right edge in each picture for each row from the top edge to the bottom edge.

The intra prediction image generation unit 310 performs the prediction in the prediction mode indicated by the intra prediction mode IntraPredMode, based on the read out adjacent PU to generate the prediction image of the PU. The intra prediction image generation unit 310 outputs the generated prediction image of the PU to the addition unit 312.

In a case that the intra prediction parameter decoder 304 derives different intra prediction modes depending on luminance and chrominance, the intra prediction image generation unit 310 generates a prediction image of a PU of luminance by any of a planar prediction (0), a DC prediction (1), and directional predictions (2 to 34) depending on a luminance prediction mode IntraPredModeY, and generates a prediction image of a PU of chrominance by any of a planar prediction (0), a DC prediction (1), directional predictions (2 to 34), and LM mode (35) depending on a chrominance prediction mode IntraPredModeC.

The inverse quantization and inverse transform processing unit 311 dequantizes the quantized coefficients input from the entropy decoder 301 to find transform coefficients. The inverse quantization and inverse transform processing unit 311 performs inverse frequency transform such as inverse DCT, inverse DST, and inverse KLT on the found transform coefficients to compute a residual signal. The inverse quantization and inverse transform processing unit 311 outputs the computed residual signal to the addition unit 312.

The addition unit 312 adds a prediction image of a PU input from the inter prediction image generation unit 309 or the intra prediction image generation unit 310 and a residual signal input from the inverse quantization and inverse transform processing unit 311 for each pixel, and generates a decoded image of a PU. The addition unit 312 stores the generated decoded image of a PU in the reference picture memory 306, and outputs a decoded image Td where the generated decoded image of the PU is integrated for each picture to the outside.

Configuration of Inter Prediction Parameter Decoder

Next, a description is given of a configuration of the inter prediction parameter decoder 303.

Figure 12:
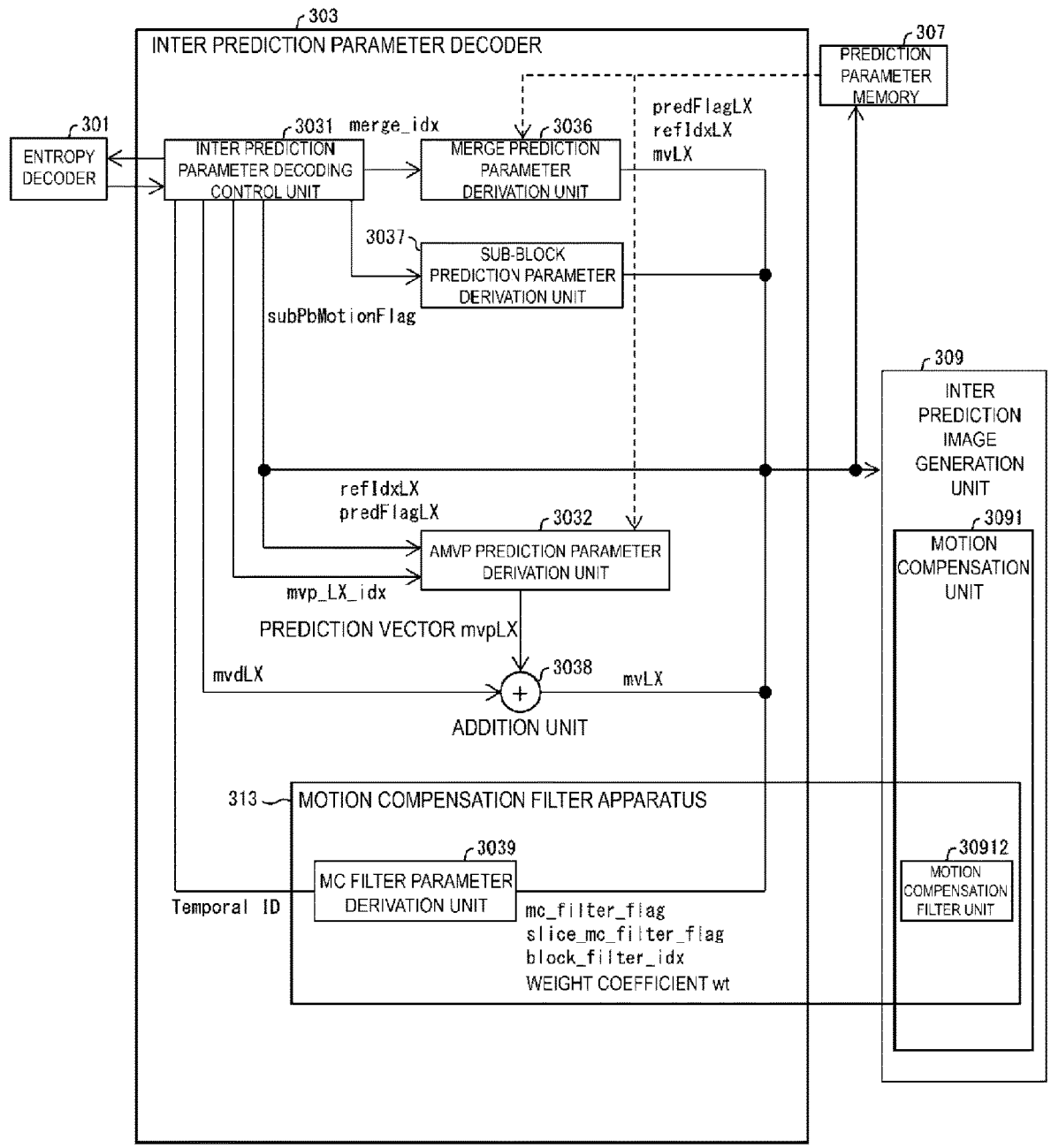
FIG. 12 is a schematic diagram illustrating a configuration of an inter prediction parameter decoder according to present embodiment.

FIG. 12 is a schematic diagram illustrating the configuration of the inter prediction parameter decoder 303 according to the present embodiment. The inter prediction parameter decoder 303 includes an inter prediction parameter decoding control unit 3031, an AMVP prediction parameter derivation unit 3032, an addition unit 3038, a merge prediction parameter derivation unit 3036, a sub-block prediction parameter derivation unit 3037, and an MC filter parameter derivation unit 3039. The motion compensation filter apparatus 313 include the MC filter parameter derivation unit (filter switching unit selection unit) 3039 and a motion compensation filter unit (filter switching processing unit, fractional sample interpolation unit) 30912 to be described later.

The inter prediction parameter decoding control unit 3031 indicates the entropy decoder 301 to decode the code (syntax element) associated with the inter prediction to extract the code (syntax element) included in the coded data, for example, the PU partition mode part_mode, the merge flag merge_flag, the merge index merge_idx, the inter prediction index inter_pred_idc, the reference picture index refIdxLX, the prediction vector index mvp_LX_idx, the difference vector mvdLX, mc_filter_flag indicating a type of the motion compensation filter (MC filter) used for each block, slice_mc_filter_flag indicating an MC filter used for each slice, mc_filter_type defining a filter applied to a block in the target slice (indicating an MC filter available as an option), num_block_filters_minus1 indicating the number of MC filters selectable for a block in a target slice, mc_filter_set_idx indicating a filter setting mode number (indicating the number of MC filters and an MC filter), block_filter_idx indicating an MC filter applied for each block, and a weight coefficient wt used to derive a filter coefficient from a prescribed MC filter, and the like.

The inter prediction parameter decoding control unit 3031 first extracts the merge flag merge_flag. An expression that the inter prediction parameter decoding control unit 3031 extracts a certain syntax element means indicating the entropy decoder 301 to decode a code of a certain syntax element to read the syntax element from the coded data.

In a case that the merge flag merge_flag is 0, that is, indicates the AMVP prediction mode, the inter prediction parameter decoding control unit 3031 uses the entropy decoder 301 to extract the AMVP prediction parameter from the coded data. Examples of the AMVP prediction parameter include the inter prediction index inter_pred_idc, the reference picture index refIdxLX, the prediction vector index mvp_LX_idx, and the difference vector mvdLX. The AMVP prediction parameter derivation unit 3032 derives the prediction vector mvpLX from the prediction vector index mvp_LX_idx. Details will be described below. The inter prediction parameter decoding control unit 3031 outputs the difference vector mvdLX to the addition unit 3038. The addition unit 3038 adds the prediction vector mvpLX and the difference vector mvdLX to derive a motion vector.

In a case that the merge flag merge_flag is 1, that is, indicates the merge prediction mode, the inter prediction parameter decoding control unit 3031 extracts the merge index merge_idx as a prediction parameter related to the merge prediction. The inter prediction parameter decoding control unit 3031 outputs the extracted merge index merge_idx to the merge prediction parameter derivation unit 3036 (details of which are described later), and outputs a sub-block prediction mode flag subPbMotionFlag to the sub-block prediction parameter derivation unit 3037. In a case that a merged mode is determined, the inter prediction parameter decoding control unit 3031 decodes a Frame Rate Up Conversion (FRUC) mode index (fruc_mode_idx) and determines whether it is a matching motion derivation mode. The matching motion derivation mode is also referred to as a Frame Rate Up Conversion (FRUC) merge mode or a FRUC mode. Specifically, in a case that merge_flag==1 is true, the inter prediction parameter decoding control unit 3031 decodes the FRUC mode index fruc_mode_idx and fruc_mode_idx!=0 is determined. In a case that fruc_mode_idx!=0 is true, a matching mode is selected as the motion vector derivation method.

The sub-block prediction parameter derivation unit 3037 partitions the PU into multiple sub-blocks depending on a value of the sub-block prediction mode flag subPbMotionFlag to derive a motion vector in units of sub-block. Specifically, in the sub-block prediction mode, a prediction block is predicted in small units of block of 4×4 or 8×8. In the image coding apparatus 11 described later, for a method in which the CU is partitioned into multiple partitions (PU of 2N×N, N×2N, N×N and the like) and a syntax of the prediction parameter is coded in units of partition, multiple sub-blocks are brought together into sets in the sub-block prediction mode and the syntax of the prediction parameter is coded for each of the sets, and therefore, motion information of many sub-blocks can be coded using a small amount of codes.

Figure 7:
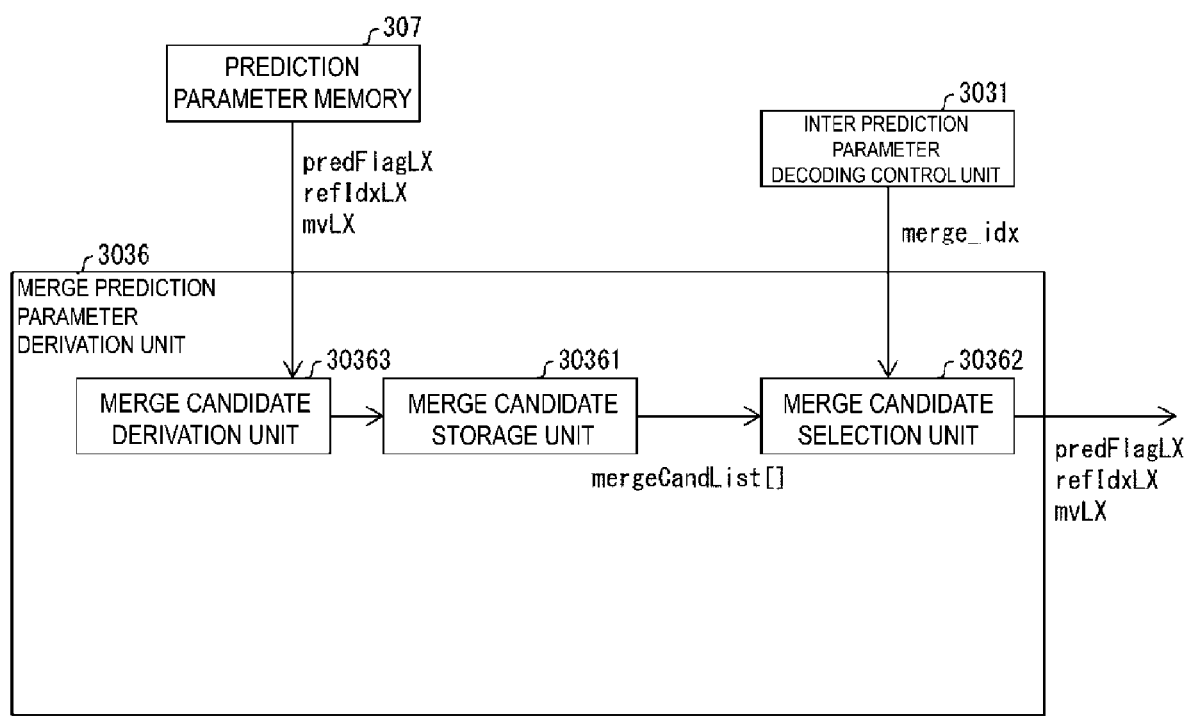
FIG. 7 is a schematic diagram illustrating a configuration of a merge prediction parameter derivation unit according to the present embodiment.

FIG. 7 is a schematic diagram illustrating a configuration of the merge prediction parameter derivation unit 3036 according to the present embodiment. The merge prediction parameter derivation unit 3036 includes a merge candidate derivation unit 30361, a merge candidate selection unit 30362, and a merge candidate storage unit 30363. The merge candidate storage unit 30363 stores merge candidates input from the merge candidate derivation unit 30361. Note that the merge candidate is includes the prediction list utilization flag predFlagLX, the motion vector mvLX, and the reference picture index refIdxLX. The merge candidate stored in the merge candidate storage unit 30363 is assigned with an index according to a prescribed rule.

The merge candidate derivation unit 30361 uses, without change, a motion vector and reference picture index refIdxLX of an adjacent PU on which the decoding process is already performed to derive a merge candidate. The affine prediction may be used as another way to derive a merge candidate. This method is described below in detail. The merge candidate derivation unit 30361 may use the affine prediction for spatial merge candidate derivation process, temporal merge candidate derivation process, combined merge candidate derivation process, and zero merge candidate derivation process which are described later. Note that the affine prediction is performed in units of sub-block, and the prediction parameter is stored in the prediction parameter memory 307 for each sub-block. Alternatively, the affine prediction may be performed in units of pixel.

Spatial Merge Candidate Derivation Process

In the spatial merge candidate derivation process, the merge candidate derivation unit 30361 reads out the prediction parameter (prediction list utilization flag predFlagLX, motion vector mvLX, reference picture index refIdxLX) stored in the prediction parameter memory 307 according to a prescribed rule to derive the read out prediction parameter as a merge candidate. The read out prediction parameters are prediction parameters related to each of the PUs in a predefined range from the decoding target PU (e.g., all or some of PUs adjoining a lower left end, upper left end, and upper right end of the decoding target PU).

Temporal Merge Candidate Derivation Process

In the temporal merge derivation process, the merge candidate derivation unit 30361 reads out, as merge candidates, the prediction parameters for the PU in the reference image including coordinates on the lower right of the decoding target PU from the prediction parameter memory 307. As a method of specifying the reference image, the reference picture index refIdxLX specified in the slice header may be used, or a minimum one of the reference picture indices refIdxLX of the PUs adjacent to the decoding target PU may be used, for example.

Combined Merge Candidate Derivation Process

In the combined merge derivation process, the merge candidate derivation unit 30361 combines motion vectors and reference picture indices of two different merge candidates which are already derived and stored in the merge candidate storage unit 30363 and combines those as motion vectors respectively for L0 and L1 to derive a combined merge candidate.

Zero Merge Candidate Derivation Process

In the zero merge candidate derivation process, the merge candidate derivation unit 30361 derives a merge candidate which has a reference picture index refIdxLX of 0 and both an X component and Y component of 0 of a motion vector mvLX.

The merge candidate derived by the merge candidate derivation unit 30361 is stored in the merge candidate storage unit 30363.

The merge candidate selection unit 30362 selects, as an inter prediction parameter for the target PU, a merge candidate assigned with an index corresponding to the merge index merge_idx input from the inter prediction parameter decoding control unit 3031, among the merge candidates stored in the merge candidate storage unit 30363. The merge candidate selection unit 30362 stores the selected merge candidate in the prediction parameter memory 307 and outputs the candidate to the prediction image generation unit 308.

Figure 8:
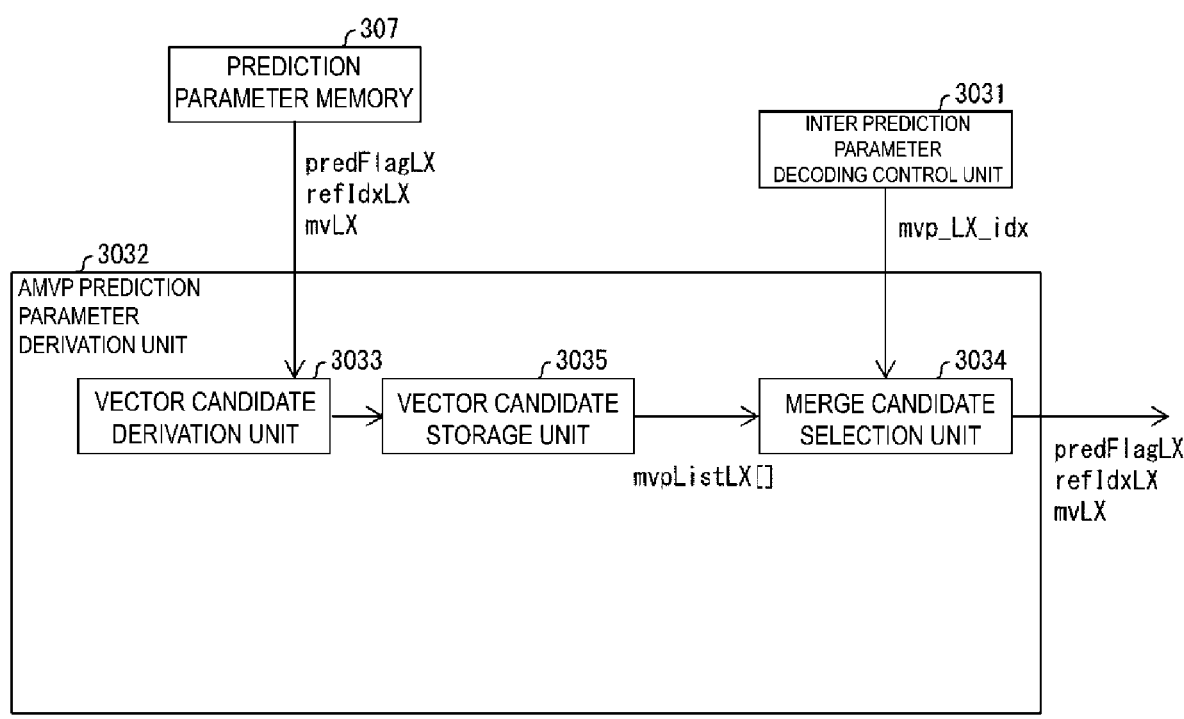
FIG. 8 is a schematic diagram illustrating a configuration of an AMVP prediction parameter derivation unit according to the present embodiment.

FIG. 8 is a schematic diagram illustrating a configuration of the AMVP prediction parameter derivation unit 3032 according to the present embodiment. The AMVP prediction parameter derivation unit 3032 includes a vector candidate derivation unit 3033, a vector candidate selection unit 3034, and a vector candidate storage unit 3035. The vector candidate derivation unit 3033 derives a prediction vector candidate from the motion vector mvLX of the PU already processed and stored in the prediction parameter memory 307 based on the reference picture index refIdx, and stores the derived prediction vector candidate in a prediction vector candidate list mvpListLX[ ] for the vector candidate storage unit 3035.

The vector candidate selection unit 3034 selects, as a prediction vector mvpLX, a motion vector mvpListLX [mvp_LX_idx] indicated by a prediction vector index mvp_LX_idx among prediction vector candidates in the prediction vector candidate list mvpListLX[ ]. The vector candidate selection unit 3034 outputs the selected prediction vector mvpLX to the addition unit 3038.

Note that the prediction vector candidate is derived by scaling a motion vector of a PU on which the decoding process is completed and which is in a predefined range from the decoding target PU (e.g., adjacent PU). Note that the adjacent PU includes a PU spatially adjacent to the decoding target PU such as a left PU and an upper PU, and a region temporally adjacent to the decoding target PU such a region which includes the same location as the decoding target PU and is obtained from the prediction parameters for the PU different in a display time.

The addition unit 3038 adds the prediction vector mvpLX input from the AMVP prediction parameter derivation unit 3032 and the difference vector mvdLX input from the inter prediction parameter decoding control unit 3031 to compute a motion vector mvLX. The addition unit 3038 outputs the computed motion vector mvLX to the prediction image generation unit 308 and the prediction parameter memory 307.

Inter Prediction Image Generation Unit 309

Figure 11:
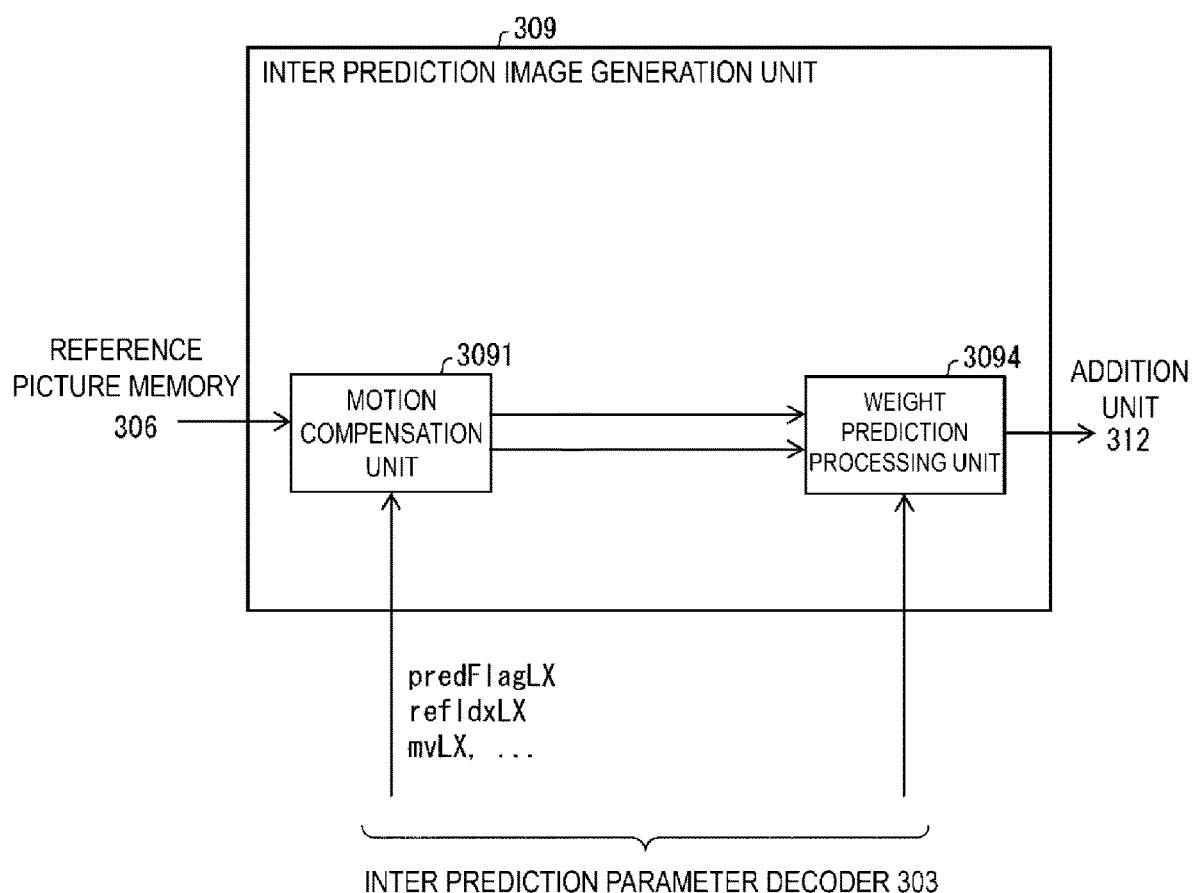
FIG. 11 is a schematic diagram illustrating a configuration of an inter prediction image generation unit according to present embodiment.

FIG. 11 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091 and a weighted prediction processing unit 3094.

Motion Compensation

The motion compensation unit 3091 reads out from the reference picture memory 306 a block which is displaced by a motion vector mvLX from a starting point at a location of the decoding target PU in the reference picture RefX specified by the reference picture index refIdxLX, based on the inter prediction parameters input from the inter prediction parameter decoder 303 (such as the prediction list utilization flag predFlagLX, the reference picture index refIdxLX, and the motion vector mvLX) to generate an interpolation image (a motion compensation image predSamplesLX). Here, in a case that a precision of the motion vector mvLX is not an integer precision, a motion compensation image (interpolation image) is generated by filtering using a filter called a Motion Compensation filter (MC filter, Interpolation Filter (IF)) for generating a pixel at fractional position.

Weighted Prediction

The weighted prediction processing unit 3094 multiplies an input motion compensation image predSamplesLX by weight coefficients to generate a prediction image of the PU. In a case that one of prediction list utilization flags (predFlagL0 or predFlagL1) is 1 (that is, in a case of the uni-prediction) and the weighted prediction is not used, processing by the following equation is performed to conform the input motion compensation image predSamplesLX (LX is L0 or L1) to the number bitDepth of pixel bits.

predSamples[x][y]=Clip3(0,(1<<bitDepth)−1,(predSamplesLX[x][y]+offset1)>>shift1)

where shift1=14−bitDepth, offset1=1<<(shift1−1).

In a case that both of the reference list utilization flags (predFlagL0 and predFlagL1) are 1 (that is, in a case of the bi-prediction BiPred) and the weighted prediction is not used, processing by the following equation is performed to average the input motion compensation images predSamplesL0 and predSamplesL1 to be conformed to the number of pixel bits.

predSamples[x][y]=Clip3(0,(1<<bitDepth)−1,(predSamplesL0[x][y]+predSamplesL0[x][y]+offset2)>>shift2)

where shift2=15−bitDepth, offset2=1<<(shift2−1).

Furthermore, in a case of the uni-prediction and that the weighted prediction is performed, the weighted prediction processing unit 3094 derives a weighted prediction coefficient w0 and an offset o0 from the coded data and performs processing by the following equation.

predSamples[x][y]=Clip3(0,(1<<bitDepth)−1,((predSamplesLX[x][y]*w0+2^(log 2WD−1))>>log 2WD)+o0)

where log 2WD represents a variable indicating a prescribed shift amount.

Further, in a case of the bi-prediction BiPred and that the weighted prediction is performed, the weighted prediction processing unit 3094 derives weighted prediction coefficients w0, w1, o0, and o1 from the coded data and performs processing by the following equation.

predSamples[x][y]=Clip3(0,(1<<bitDepth)−1,(predSamplesL0[x][y]*w0+predSamplesL1[x][y]*w1+((o0+o1+1)<<log 2WD))>>(log 2WD+1))

Motion Vector Decoding Process

Hereinafter, a description is specifically given of the motion vector decoding process according to the present embodiment referring to FIG. 9.

As is obvious from the above description, the motion vector decoding process according to the present embodiment includes processing of decoding the syntax element associated with the inter prediction (referred to as a motion syntax decoding process) and processing of deriving the motion vector (motion vector derivation process).

Motion Syntax Decoding Process

Figure 9:
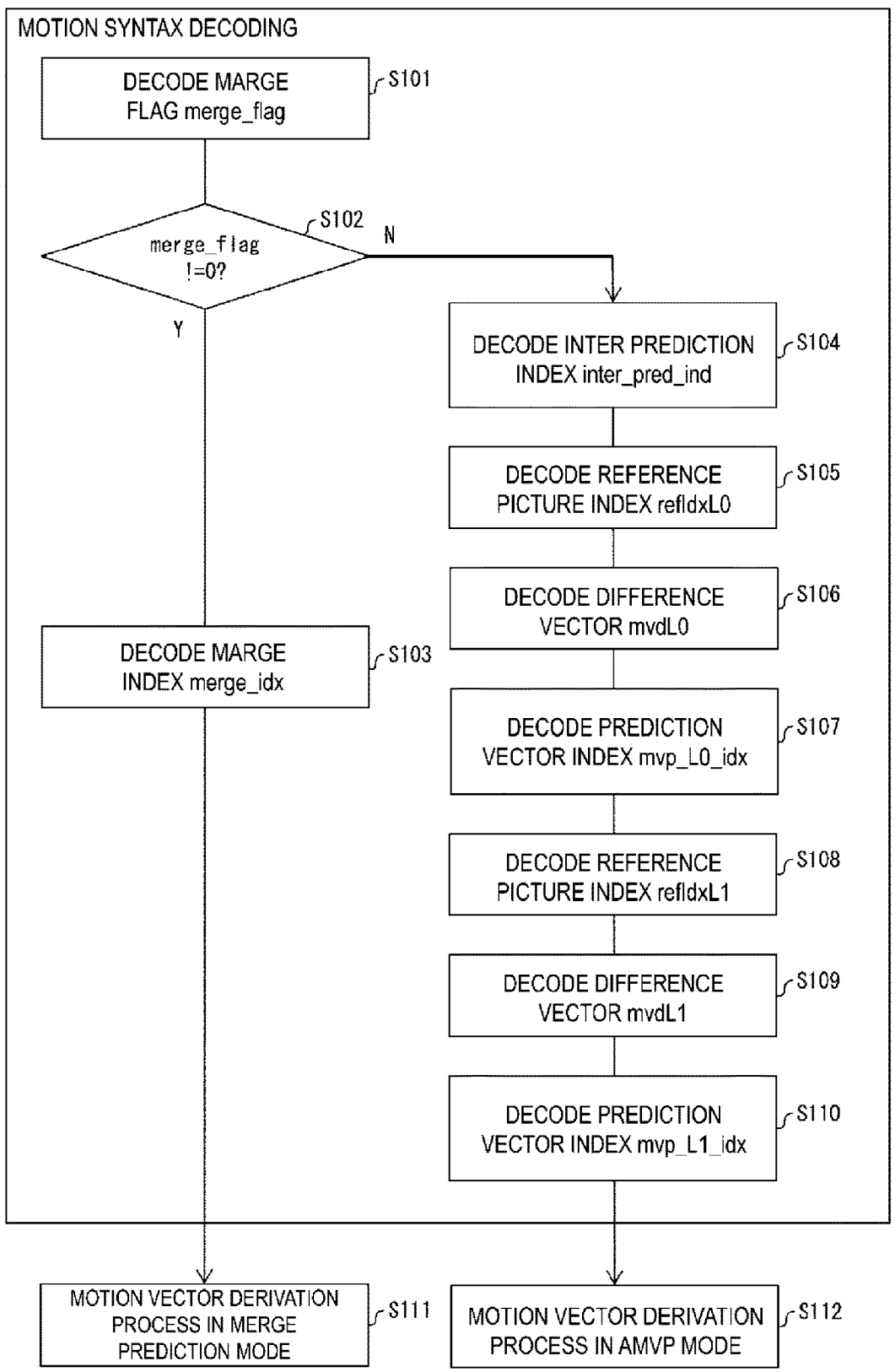
FIG. 9 is a flowchart illustrating an operation of a motion vector decoding process in the image decoding apparatus according to the present embodiment.

FIG. 9 is a flowchart illustrating a flow of an inter prediction syntax decoding process which is performed by the inter prediction parameter decoding control unit 3031. In the following description in FIG. 9, each process is performed by the inter-prediction parameter decoding control unit 3031 unless otherwise specifically described.

First, the merge flag merge_flag is decoded at step S101, and merge_flag!=0 (whether or not merge_flag equals to 0) is determined at step S102.

In a case that merge_flag!=0 is true (Y at S102), the marge index merge_idx is decoded at S103 and the motion vector derivation process in the merge mode (S111) is performed.

In a case that merge_flag!=0 is false (N at S102), the inter prediction index inter_pred_ide is decoded at S104.

In a case that inter_pred_ide is other than PRED_L1 (that is, PRED_L0 or PRED_BI), the reference picture index refIdxL0, a difference vector parameter mvdL0, and a prediction vector index mvp_L0_idx are decoded at S105, S106, and S107, respectively.

In a case that inter_pred_idc is other than PRED_L0 (that is, PRED_L1 or PRED_B1), the reference picture index refIdxL1, a difference vector parameter mvdL1, and a prediction vector index mvp_L1_idx are decoded at S108, S109, and S110, respectively. Subsequently, the motion vector derivation process in the AMVP mode (S112) is performed.

Motion Compensation Filter (MC Filter)

Here, details of the MC filter will be described. Hereinafter, the motion compensation filter included in the motion compensation unit 3091 will be described with reference to FIG. 13 and FIG. 14.

Figure 13:
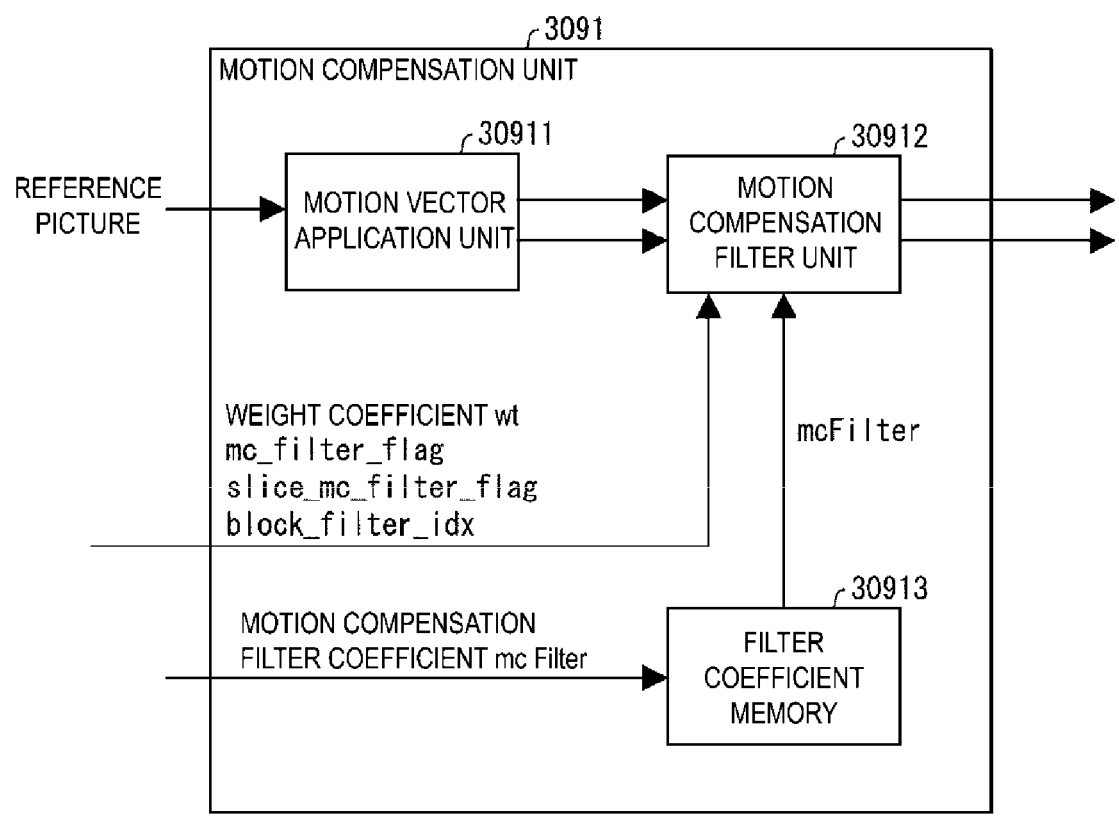
FIG. 13 is a diagram illustrating a configuration of a motion compensation unit according to the present embodiment.

FIG. 13 is a block diagram illustrating a specific configuration of the motion compensation unit 3091. As illustrated in FIG. 13, the motion compensation unit 3091 includes a motion vector application unit 30911, a motion compensation filter unit (filter switching processing unit) 30912, and a filter coefficient memory 30913.

The motion vector application unit 30911 reads out from the reference picture memory 306 a block, as a full sample image, which is displaced by a motion vector mvLX from a starting point at a location of the decoding target block of the reference picture specified by the reference picture index refIdxLX, based on the prediction list utilization flag predFlagLX, the reference picture index refIdxLX, and the motion vector mvLX input from the inter prediction parameter decoder 303.

The motion compensation filter unit 30912 applies the motion compensation filter (MC filter) on the full sample image to derive a motion compensation image predSamples.

The MC filter is used to calculate a value of a non-integer position pixel using a value of the full sample image corresponding to integer position pixels, in the case that the motion vector mvLX is not at an integer position.

In a case that the motion vector mvLX is at an integer position, a value of a non-integer position pixel may be calculated using a value of the full sample image corresponding to integer position pixels, or the read full sample image may be output without change as the motion compensation image predSamples. At this time, a prescribed shift or the like may be applied to the full sample image.

The filter coefficient memory 30913 stores the motion compensation filter coefficients decoded from the coded data. More specifically, the filter coefficient memory 30913 stores therein filter coefficients that are used by the motion compensation filter unit 30912.

Note that the motion compensation filter coefficient stored in the filter coefficient memory 30913 may be stored in advance in the filter coefficient memory 30913 rather than being decoded from the coded data.

Filter Coefficient of MC Filter

Here, details of the filter coefficient of the MC filter will be described with reference to FIG. 14. FIG. 14 is a diagram illustrating an example of the filter coefficient of the MC filter according to the present embodiment. (a) of FIG. 14 illustrates an example of the filter coefficient of the MC filter applying on a luminance pixel. (b) of FIG. 14 illustrates an example of the filter coefficient of the MC filter applying on a chrominance pixel. The motion compensation filter unit 30912 applies the filter coefficients illustrated in FIG. 14 to each pixel of the full sample image. The motion compensation filter unit 30912 outputs a value obtained by normalizing the filtered pixel (here, a value obtained by right shifting by six bits) as an interpolation image predSamples.

A filter coefficient mcFilter[i][k] illustrated in (a) of FIG. 14 illustrates a filter coefficient mcFilter[i][k] in a case that the total number of motion vector phases (i=0 . . . 15) is 16 and the number of filter taps is eight (eight taps (k=0 . . . 7)). The total number of supported phases is equal to an accuracy of the motion vector. Specifically, in a case that the total number of phases is M, the accuracy of the motion vector will be 1/M pixel accuracy. As illustrated in (a) of FIG. 14, for example, in a case that the accuracy of the motion vector is 1/16 pixel accuracy, the filter coefficients corresponding to the respective reference pixel positions in units of 1/16 luminance pixel in the motion vector are prepared as filter coefficients for different phases.

The filter coefficient may be set by an integer and a shift value from the perspective of suppressing a computation speed, an amount of memory, and the like. The filter coefficients may also be set by other expressions. A sum of filter coefficients in each phase may be set to a power of 2, for example, 64 (=2^6).

For example, the filter coefficients {0, 0, 0, 64, 0, 0, 0, 0} illustrated at the top row of (a) of FIG. 14 indicate filter coefficients for the respective coefficient positions in phase i=0 (an integer position). Here, the coefficient position refers to a relative position of the pixel on which the filter coefficient is to apply. The value of the coefficient is an integer normalized by 64 in (a) and (b) of FIG. 14. Thus, in each phase, the sum of filter coefficients is 64.

Each filter coefficient is made into an integer to be about 64 times a fractional value representing a weight for each reference pixel with a sum of the coefficients being 1. Such a case may be expressed as that an accuracy of the filter coefficient is 6-bit. Note that the filter coefficient may be a negative value. Therefore, the above description does not mean that each filter coefficient can be expressed as a value equal to or less than 6 bits (e.g., a combination of a coefficient having a value of 65 and a coefficient having a value of −1, and the like).

For example, the filter coefficients of the phase iFrac=0 (the integer position) illustrated in (a) and (b) of FIG. 14 are weighted with 100% in one pixel. Referring to the filter coefficient of the phase iFrac=8 (0.5 position) illustrated in (a) of FIG. 14, the weighting in each pixel at the relative position is left-right symmetrical. In the filter coefficients of the phase nFrac and the filter coefficients of phase M-nFrac, weighting in each pixel at the relative position is left-right symmetrical. For example, in a case of the number of phases M=16, the filter coefficients of phase 1, phase 2, phase 3, phase 4, phase 5, phase 6, and phase 7 are in a left-right symmetric positional relationship with the filter coefficients of phase 15, phase 14, phase 13, phase 12, phase 11, phase 10, and phase 9, respectively.

On the other hand, (b) of FIG. 14 illustrates an example of the filter coefficient mcFilter[i][k] in a case that the total number of motion vector phases M is 32 (iFrac=0 . . . 31), and the number N of filter taps is four (four taps (k=0 . . . 3)).

As illustrated in (b) of FIG. 14, in a case that the accuracy of the motion vector is 1/32 pixel accuracy, the filter coefficients corresponding to the respective reference pixel positions in units of 1/32 luminance pixel are prepared as filter coefficients for different phases.

For example, the motion compensation filter unit 30912 performs processing using the MC filter in the horizontal direction of the full sample image to derive a temporal image.

Subsequently, the motion compensation filter unit 30912 performs processing using the MC filter in the vertical direction of the temporal image to generate an interpolation image (motion compensation image).

Hereinafter, the filter coefficients used in the MC filter may also be simply referred to as the "MC filter".

Overview of Motion Compensation Filter Apparatus 313

Next, an overview of the motion compensation filter apparatus 313 according to the present embodiment will be described. The motion compensation filter apparatus 313 applies on pixel values of the full sample image at the integer pixel positions to calculate the pixel values at the fractional pixel position, and thereby, generates the filtered image. As illustrated in FIG. 12, the motion compensation filter apparatus 313 includes the motion compensation filter unit 30912 and the MC filter parameter derivation unit 3039.

The motion compensation filter unit 30912 switches the MC filter to apply on the full sample image in a certain unit. The MC filter parameter derivation unit 3039 selects a switching unit for switching the MC filter by the motion compensation filter unit 30912.

For example, the MC filter parameter derivation unit 3039 sets the switching unit for switching the MC filter by the motion compensation filter unit 30912 to a slice unit or a block unit and selects the filter index.

According to the above-described configuration, for example, in a case that the MC filter parameter derivation unit 3039 sets the switching unit for switching the filter to the slice unit, the blocks included in that slice is processed using the same filter. In other words, decoding of a flag or the like indicating the type of MC filter to be applied for each block can be omitted. Accordingly, an overhead on a flag indicating the MC filter applied to each block can be suppressed.

Note that the sequence parameter set SPS may include a flag (sps_mc_filter_flag) indicating on and off states of the switching the MC filter by the motion compensation filter unit 30912 as the coding parameter. For example, in a case of sps_mc_filter_flag=0, switching of the MC filter in slice units and block units is turned off. In particular, in a case of sps_mc_filter_flag=0, the MC filter parameter derivation unit 3039 does not decode the flag for the MC filter switching from the coded data even in generating any motion compensation image (the switching flag for the MC filter is not coded).

Example of Setting Switching Unit for Switching MC Filter in Accordance with Picture Type Next, an example of setting the switching unit for switching the MC filter performed by the MC filter parameter derivation unit 3039 is illustrated.

In this example, the MC filter parameter derivation unit 3039 selects the switching unit for switching the MC filter in accordance with a picture type of the target image. The MC filter parameter derivation unit 3039 switches the MC filter in block units in a case that the picture type is a first image and in slice units in a case that the picture type is a second image. For example, in a case that the target image is a reference picture, the MC filter parameter derivation unit 3039 treats the target image as the first image. In a case that the target image is a non-reference picture, the MC filter parameter derivation unit 3039 treats the target image as the second image.

Specifically, the MC filter parameter derivation unit 3039 determines whether or not the target image is a reference picture (image referenced from subsequent images in coding and decoding order) in accordance with a type of a Network Abstraction Layer (NAL) unit. For example, in a case that the name of a NAL unit type (nal_unit_type) of an image indicates IRAP pictures (IDR, BRA, CRA), the image is a reference picture. In a case that a name of a NAL unit type of an image includes "_R" (where R represents "Reference") like TRAIL_R, the image is a reference picture. On the other hand, in a case that a name of a NAL unit type of an image includes "_N" (where N represents "Non reference)" like TRAIL_N, the image is a non-reference picture.

The MC filter parameter derivation unit 3039 sets the switching unit for switching the MC filter to the block unit for the first image. The MC filter parameter derivation unit 3039 sets the switching unit for switching the MC filter to the slice unit for the second image.

Specifically, the MC filter parameter derivation unit 3039 decodes a flag, mc_filter_flag, indicating the MC filter for each block (e.g., CU or CTU) for the first image. The motion compensation filter unit 30912 switches the MC filter used for the blocks included in the target slice depending on the flag mc_filter_flag in block units. For example, in a case of mc_filter_flag=0, the motion compensation filter unit 30912 switches the MC filter used for the target block to a first MC filter to perform the filter processing. In a case of mc_filter_flag=1, the motion compensation filter unit 30912 switches the MC filter used for the target block to a second MC filter to perform the filter processing.

Note that the expression "the MC filter parameter derivation unit 3039 decodes xxx" specifically refers to "the MC filter parameter derivation unit 3039 decodes xxx using the entropy decoder 301."

On the other hand, the MC filter parameter derivation unit 3039 decodes a flag, slice_mc_filter_flag, indicating the MC filter included in the slice header SH for the second image. The motion compensation filter unit 30912 switches the MC filter used for the blocks included in the target slice depending on the flag slice_mc_filter_flag in slice units. For example, in a case of slice_mc_filter_flag=0, the motion compensation filter unit 30912 switches the MC filter used for the blocks included in the target slice to the first MC filter to perform the filter processing on the blocks. In a case of slice_mc_filter_flag=1, the motion compensation filter unit 30912 switches the MC filter used for the blocks included in the target slice to the second MC filter to perform the filter processing on the blocks.

According to the above-described configuration, for example, the switching unit for switching the filter can be changed between for a reference picture where an image with distortion reduced by using the filter switching with a higher precision (small unit) is desired and for a picture where other factors such as latency of the process and an amount of codes are relatively important.

Note that the MC filter parameter derivation unit 3039 may determine whether the target image is the first image or the second image using a Temporal ID (TID) of the target image. The TID of the target image is a value obtained by adding 1 to nuh_temporal_id_plus1 of nal_unit_header, for example. For example, in a case that the TID of the target image is less than or equal to a threshold TH_TID (e.g., TID<=TH_TID), the target image may be determined to be the first image. In a case that the TID of the target image is more than or equal to the threshold TH_TID (e.g., TID>TH_TID), the target image may be determined to be the second image. The TH_TID may be 1, 2, and the like, for example.

Example of Setting Switching Unit for Switching MC Filter in Accordance with the Number of MC Filters Selectable for Target Slice Next, another example of setting the switching unit for switching the MC filter performed by the MC filter parameter derivation unit 3039 is illustrated.

In this example, the MC filter parameter derivation unit 3039 sets (selects) the switching unit for switching the MC filter in accordance with the number of MC filters selectable for a unit of the target images.

Specifically, in a case that the number of MC filters selectable for the target slice is one, the MC filter parameter derivation unit 3039 sets the switching unit for switching the MC filter for each slice unit. Specifically, the MC filter parameter derivation unit 3039 decodes information (NumBlockFilters) of the MC filter switching unit that is set for the target slice. The MC filter parameter derivation unit 3039 may further decode information of the selectable MC filters, mc_filter_type. The motion compensation filter unit 30912 switches the MC filter used for the blocks (e.g., CU) included in the target slice to the MC filter indicated by the above flag to perform the filter processing. That is, the motion compensation filter unit 30912 makes the identical MC filter apply on the blocks included in the slice. In other words, in a case that the number of selectable MC filters set for the target slice, NumBlockFilters, is one, the motion compensation filter unit 30912 fixedly uses the MC filter for the blocks included in the target slice.

According to the above-described configuration, in a case that the number of filters for a unit is only one, the MC filter parameter derivation unit 3039 may omit decoding of the information block_filter_idx indicating the MC filter for each block included in the unit.

In a case that the number of selectable MC filters NumBlockFilters set for the target slice is multiple, the MC filter parameter derivation unit 3039 sets the switching unit for switching the MC filter to the block unit. Specifically, the MC filter parameter derivation unit 3039 decodes information, lock_filter_idx, indicating the MC filter set for each block among the MC filters selectable for the target slice.

The motion compensation filter unit 30912 switches the set MC filter for each block and performs the filter processing on the target block.

Example of Identifying MC Filter Selectable for Target Slice

Here, an example of identifying an MC filter that is selectable for each target slice performed by the motion compensation filter apparatus 313 will be described. The MC filter parameter derivation unit 3039 decodes a list mc_filter_type[ ] indicating the MC filters selectable for each target slice to identify a selectable MC filter. More specifically, a filter coefficient used by the MC filter indicated by each index i is identified using a value of mc_filter_type[i] (i=0 . . . N−1, where N=3).

For example, a case is described where the following filter coefficients indicated by fixed filter coefficient index cidx of 0 to 3 are defined as a set of filter coefficients.
  cidx=0: FILTER_TYPE_DCTIF
  cidx=1: FILTER_TYPE_Lanczos
  cidx=2: FILTER_TYPE_MaxFlat
  cidx=3: FILTER_TYPE_DCTIF_WITH_LOWPASS Note that the number of fixed filter coefficients is not limited to four, and may be another value that is two or more.

In a case that values of the list of mc_filter_type[0], mc_filter_type[1], and mc_filter_type[2] indicating the selectable MC filters are decoded as 0, 2, and 1, the filters selectable for the blocks in the target slice are FILTER_TYPE_DCTIF, FILTER_TYPE_MaxFlat, and FILTER_TYPE_Lanczos of cidx corresponding to decoded 0, 2, and 1.

In a case that an index block filter idx of the MC filter is 0, FILTER_TYPE_DCTIF is selected here because the filter indicated by mc_filter_type[0] is selected.

Eventually, the filters are selected as follows for filter indexes block_filter_idx of 0 to 2.
  block_filter_idx=0=>filter of mc_filter_type[0]=>filter of cidx=0 (FILTER_TYPE_DCTIF)
  block_filter_idx=1=>filter of mc_filter_type[1]=>filter of cidx=2 (FILTER_TYPE_MaxFlat)
  block_filter_idx=2=>filter of mc_filter_type[2]=>filter of cidx=1 (FILTER_TYPE_Lanczos)

The MC filter parameter derivation unit 3039 decodes each mc_filter_type[n] (n=0 to N−1). Next, the MC filter parameter derivation unit 3039 decodes the index of the MC filter (block_filter_idx) to be used in each block.

The motion compensation filter unit 30912 references mc_filter_type[block_filter_idx] to perform the filter processing on target block using a value of the filter coefficient of the MC filter.

Example 1 of Identifying MC Filters Selectable for Target Slice and the Number of MC Filters Next, an example of identifying the number and type of MC filters selectable for each target slice performed by the motion compensation filter apparatus 313 will be described. Note that in this example, the number of MC filters selectable each target slice is variable. The MC filter parameter derivation unit 3039 decodes num_block_filters_minus1 indicating the number of MC filters NumBlockFilters selectable for the blocks in the target slice. For example, in a case that num_block_filters_minus1 is 0, the number of MC filters NumBlockFilters selectable for the blocks in the target slice is 1. In a case that num_block_filters_minus1 is 1, the number of MC filters selectable for the blocks in the target slice is 2. That is, in a case that num_block_filters_minus1 is N−1, the number of MC filters NumBlockFilters selectable for the blocks in the target slice is N.

Note that the identifying the MC filter selectable in the target slice performed by the MC filter parameter derivation unit 3039 is the same as the above-described example, and thus a description thereof will be omitted.

Example 2 of Identifying MC Filters Selectable for Target Slice and the Number of MC Filters Next, another example of identifying the number and type of MC filters selectable for each target slice performed by the motion compensation filter apparatus 313 will be described.

In this example, a set indicating the number and combination of MC filters selectable in each target slice is configured in advance. In the above set, the MC filter indicated by each piece of information (mc_filter_type[n], n=0 to N−1) may be defined.

The MC filter parameter derivation unit 3039 decodes the filter setting mode number (mc_filter_set_idx) specifying the above set.

FIG. 15 is a diagram illustrating an example of a set indicating the number and combination of MC filters corresponding to a value of mc_filter_set_idx. As illustrated in in FIG. 15, in a case of mc_filter_set_idx=0, the number of MC filters is one (N=1). An MC filter selectable for the target slice is filter A. In a case of mc_filter_set_idx=1, the number of MC filters is two (N=2). An MC filter selectable for the target slice includes filter A and filter B. In a case of mc_filter_set_idx=2, the number of MC filters is two (N=2). An MC filter selectable for the target slice includes filter A and filter C. In a case of mc_filter_set_idx=3, the number of MC filters is three (N=3). An MC filter selectable for the target slice includes filter A, filter B, and filter C.

Note that the sequence parameter set SPS may include a definition of a set of filters as the coding parameters. In this case, the MC filter parameter derivation unit 3039 decodes a parameter indicating the number of filter sets, M (the maximum of mc_filter_set_idx+1). Next, the MC filter parameter derivation unit 3039 decodes num_block_filters_minus1 indicating the number of MC filters included in each filter set, and mc_filter_type[i] indicating the MC filter included in each filter set in the slice header.

Example of Identifying the Number of MC Filters Selectable for Target Slice and Deriving Coefficients of MC Filters Next, an example of deriving the number of MC filters selectable for each target slice and the coefficients of the MC filters performed by the motion compensation filter apparatus 313 will be described.

In this example, the motion compensation filter unit 30912 derives a filter coefficient of the MC filter to apply on the full sample image from a linear sum calculated from coefficients and weight coefficients of prescribed multiple MC filters. Specifically, the MC filter parameter derivation unit 3039 first decodes a weight coefficient wt and num_block_filters_minus1 for deriving the filter coefficient of the MC filter. For example, in a case that num_block_filters_minus indicating the number of MC filters selectable for the blocks in the target slice is three (N=3), the MC filter parameter derivation unit 3039 decodes three weight coefficients wt[0], wt[1], and wt[2].

Next, the motion compensation filter unit 30912 calculates the filter coefficients of the filters indicated by mc_filter_type[n] that is the filter index n with n=0 . . . N−1 using the decoded weight coefficients wt. An example of the calculation of the filter coefficients of the MC filter to apply on the full sample image is described below.

Filter coefficient of MC filter with the index n=(wt[n]*{filter coefficient of filter A}+(64−wt[n])*{filter coefficient of filter B})/64

Where n is 0 to num_block_filters_minus1.

The computation of the values of each of the filter coefficients is as follows.

mcFilter with the index n[i][k]=(wt[i]*mcFilterA[i][k]+(64−wt[i])*mcFilterB[i][k])/64

Where, x=0 . . . M−1, k=0 . . . the number of taps −1.

Specifically, three different filter coefficients can be derived by substituting wt[0], wt[1], and wt[2] into wt[i] described above. Note that the filter coefficient of the filter A and the filter coefficient of the filter B may be stored in advance in the filter coefficient memory 30913 rather than being decoded from the coded data.

The motion compensation filter unit 30912 performs the filter processing on the blocks in the target slice using the MC filter having the derived filter coefficient.

In the above-described configuration, in a case that a negative value is allowed as the weight coefficient wt, it is possible to calculate not only the filter coefficients of an interpolation of the characteristics between the filter A and the filter B, but also the filter coefficients of an extrapolation. On the other hand, in general, the lager the difference between the properties of the filter A and the filter B, the lager a variation of the filter coefficients derived by the weighted average. Therefore, the lager difference between the properties of the filter A and the filter B is more effective to the switching of the filter coefficient in the this configuration. Thus, for example, FILTER_TYPE_DCTIF having a property of maintaining edges may be used for the filter A, and FILTER_TYPE_MaxFlat having a smooth property although slightly degrading edges may be used for the filter B.

According to the above-described configuration, more motion compensation filters can be generated from a prescribed number of motion compensation filters.

Variation of MC Filter

Here, another example of the MC filter selectable for the target slice will be described. Between the MC filters indicated by each mc_filter_type[i], there may be variations in configurations other than characteristics (filter coefficients). An example of the variation will be described.

For example, the number of taps of the MC filter indicated by each mc_filter_type[i] may vary as follows.

The MC filter indicated by mc_filter_type[0] is a 4-tap filter.

The MC filter indicated by mc_filter_type[1] is an 8-tap filter.

The MC filter indicated by mc_filter_type[2] is a 2-tap filter.

In other words, the numbers of taps of the filter coefficients switched in block units or slice units in a syntax such as block_filter_idx may be different.

The number of taps of the MC filter in the horizontal direction (horizontal filter) and the number of taps of the MC filter in the vertical direction (vertical filter) indicated by each mc_filter_type[i] may be different from each other as follows.

In the MC filter indicated by mc_filter_type[0], the numbers of taps of the horizontal filter and the vertical filter are the same. Note that the filter coefficient may be used as or may be defined separately for both the horizontal filter and the vertical filter.

In the MC filter indicated by mc_filter_type[1], the number of taps of the horizontal filter is larger than that of the vertical filter.

In the MC filter indicated by mc_filter_type[2], the number of taps of the vertical filter is larger than that of the horizontal filter.

That is, the filter coefficients switched in block units or slice units in a syntax such as block_filter_idx are different between the vertical filter and the horizontal filter, and the vertical filter and the horizontal filter may be different from each other in the number of taps.

Note that the motion compensation filter unit 30912 may perform the filter processing using a filter, of the horizontal filter and the vertical filter, smaller in the number of taps or narrower in a range of values of filter results. According to the above-described configuration, loss of accuracy can be suppressed even in a case that the memory region (specifically, a bit width) for storing the intermediate data is limited.

In the MC filter indicated by each mc_filter_type[i], a direction of the referenced pixels distribution may vary as follows.

The MC filter indicated by mc_filter_type[0] is a horizontal filter and a vertical filter.

The MC filter indicated by mc_filter_type[1] is a filter that performs the filter processing on the reference pixels distributed in a direction of 45 degrees or 135 degrees with respect to the horizontal direction of the target image. Note that the above-described angle of the distribution of the reference pixels with respect to the horizontal direction of the target image may be set to any angle.

Example 1 of Identifying MC Filter Used in Each Block

An example of processing of the motion compensation filter apparatus after identifying the MC filter selectable for the target slice by any of the examples described above will be described.

In this example, the MC filter parameter derivation unit 3039 decodes or derives block_filter_idx. block_filter_idx indicates the MC filter to apply on the target block. Here, the MC filter indicated by block_filter_idx is any of the MC filters selectable for a slice that includes the target block. In a case that the number of MC filters selectable for the slice including the target block is N, the maximum of block_filter_idx is N−1. The motion compensation filter unit 30912 uses the MC filter indicated by block_filter_idx to perform the filter processing on each target block.

In a case that the number of MC filters NumBlockFilters indicating the number of MC filters selectable for the blocks in the target slice is 1, the following processes are performed. Here, the number of MC filters NumBlockFilters is num_block_filters_minus+1. The MC filter parameter derivation unit 3039 sets the switching unit for switching the MC filter not to the block unit but to the slice unit. To be more specific, the MC filter parameter derivation unit 3039 sets values of block_filter_idx of all blocks included in the target slice to 0. That is, the coding parameter indicating the MC filter to be set for the block included in the target slice are not coded by the image coding apparatus 11. Note that an image including the target slice for which the number of MC filters NumBlockFilters is set to 1 may be a non-reference image.

In a case that the number of MC filters NumBlockFilters is larger than 1, that is, in a case that the number of MC filters selectable for the blocks in the target slice is more than one, the following processes are performed. The MC filter parameter derivation unit 3039 sets the switching unit for switching the MC filter to the block. Specifically, the MC filter parameter derivation unit 3039 decodes block_filter_idx for each block included in the target slice.

FIG. 16 is a diagram illustrating an example of the filer index according to this example. To be more specific, this figure is a diagram illustrating an example of a relationship between the value of block_filter_idx and the MC filter indicated by the value of block_filter_idx. As illustrated in FIG. 16, in a case of block_filter_idx=0, the motion compensation filter unit 30912 performs the filter processing on the target block using filter A that is a prescribed first filter defined by mc_filter_type[0]. In a case of block_filter_idx=1, the motion compensation filter unit 30912 performs the filter processing on the target block using filter B that is a prescribed second filter defined by mc_filter_type[1]. In a case of block_filter_idx=2, the motion compensation filter unit 30912 performs the filter processing on the target block using filter C that is a prescribed third filter defined by mc_filter_type[2]. For example, assume that filter A is a DCT interpolation filter (FILTER_TYPE_DCTIF), filter B is a MaxFlat filter (FILTER_TYPE_MaxFlat), and filter C is a Lanczos filter (FILTER_TYPE_Lanczos). For each filter, a specific example of an coefficient applied to luminance (where describes the phases until ⅛ pixel accuracy) is illustrated in (a) to (c) of FIG. 22.

Example 2 of Identifying MC Filter Used in Each Block (Merge Mode)

Next, an example will be described in which the MC filter parameter derivation unit 3039 does not decode block_filter_idx for each block even in the case that the value of the number of MC filters NumBlockFilters is larger than 1. For example, in a case that a prescribed coding tool is applied to the target block, the MC filter parameter derivation unit 3039 does not decode the block_filter_idx from the coded data. Then, the MC filter parameter derivation unit 3039 derives a value of block_filter_idx in a manner different from the decoding of block_filter_idx. Specifically, the switching unit for switching the filter is selected.

For example, in a case that the merge mode is applied to the target block (where merge_flag is 1, that is, merge_flag is true), the MC filter parameter derivation unit 3039 sets the value of block_filter_idx of the target block to the value of block_filter_idx of a reference block in the merged mode.

Note that in a case that the value of block_filter_idx of the reference block for the target block is not available, block_filter_idx may be set to a default value (e.g., 0). Here, the reference block is a block designated by a merge index from the merge candidate derived for the target block (CU). For example, the block is a block that is adjacent to the left side or the upper side of the target block, or adjacent in the temporal direction, and the like. Specifically, in the target block, the value of block_filter_idx of the reference block is inherited in the same manner as the motion vector of the reference block, the reference picture index, and the like.

In the case that the merge mode is applied to the target block, the MC filter parameter derivation unit 3039 may set the value of block_filter_idx of the target block to the default value (e.g., 0).

In other words, the motion compensation filter unit 30912 switches the MC filter to apply on the region to which the merge prediction mode is applied, to the MC filter used for a reference region of the region. As such, the motion compensation filter unit 30912 switches the MC filter for the target block to an MC filter suitable for the image features in the reference image region to perform the filter processing on the target block.

According to the above-described configuration, the filter used for the reference region can be made to apply on the region to which the merge prediction mode is applied. Specifically, the decoding can be omitted of the flag indicating the MC filter for the region to which the merge prediction mode is applied or the like.

Figure 17:
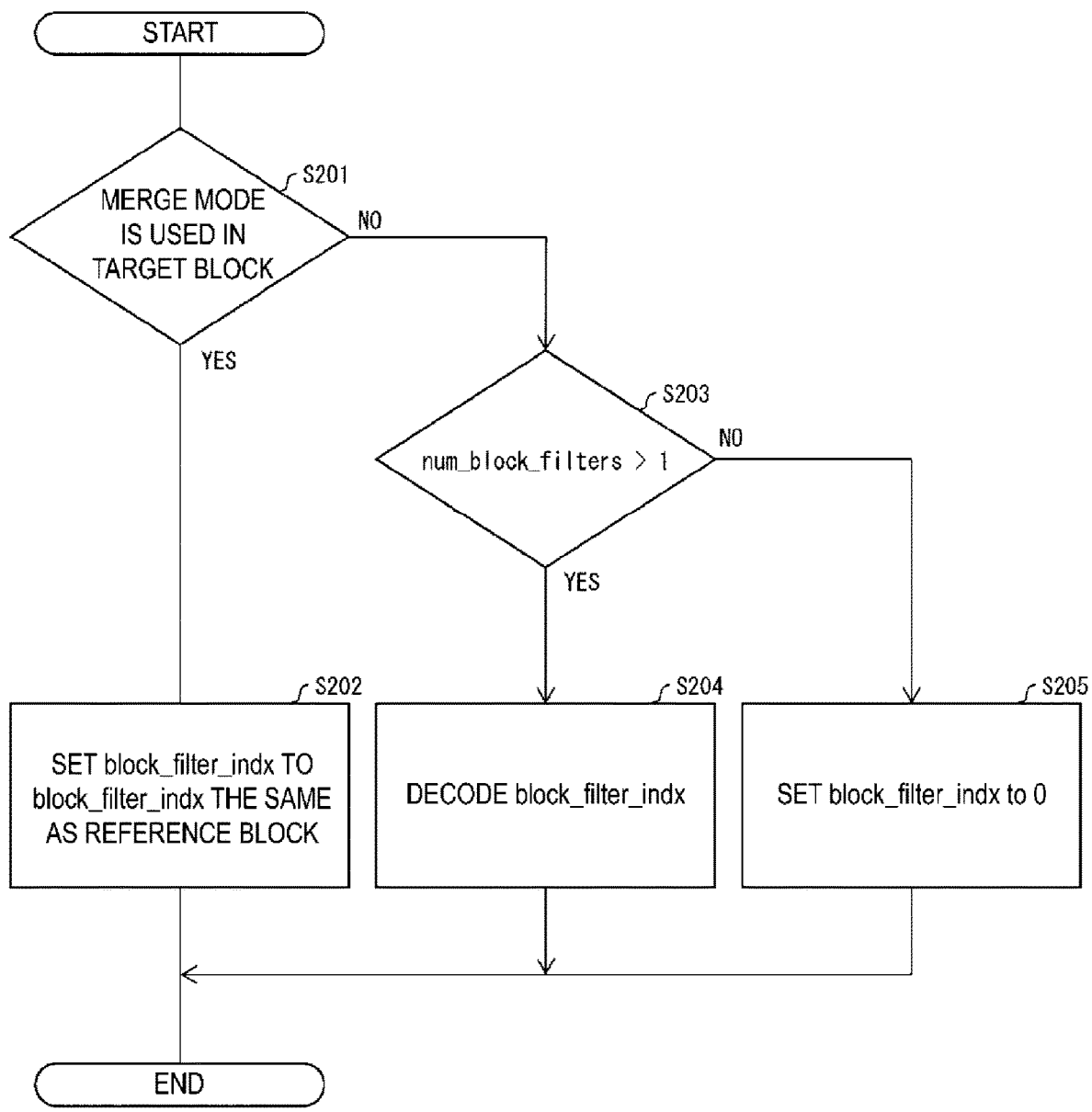
FIG. 17 is a flowchart illustrating an example of an operation of a filter index decoding process in the image decoding apparatus according to the present embodiment.

Next, an example of a process flow of the MC filter parameter derivation unit 3039 in this example will be described with reference to FIG. 17. FIG. 17 is a flowchart illustrating an example of the process flow of the MC filter parameter derivation unit 3039. As illustrated in FIG. 17, the MC filter parameter derivation unit 3039 references merge_flag to determine whether or not the merge mode is applied to the target block (S201). In a case that the merge mode is applied to the target block (YES in S201), the MC filter parameter derivation unit 3039 sets block_filter_idx of the reference block to block_filter_idx of the target block (S202). Then, the process ends.

In a case that the merge mode is not applied to the target block (NO in S201), the MC filter parameter derivation unit 3039 determines whether or not the number of MC filters NumBlockFilters is larger than 1 (S203). In a case that the number of MC filters NumBlockFilters is larger than 1 (YES in S203), the MC filter parameter derivation unit 3039 decodes block_filter_idx of the target block (S204). Then, the process ends. Note that in a case that the number of MC filters NumBlockFilters is not larger than 1 (NO in S203), the MC filter parameter derivation unit 3039 sets block_filter_idx of the target block to block_filter_idx=0 (S205). Then, the process ends.

Example 3 of Identifying MC Filter Used in Each Block (Merge Mode, FRUC) Next, another example will be described in which the MC filter parameter derivation unit 3039 does not decode block_filter_idx for each block even in the case that the value of the number of MC filters NumBlockFilters is larger than 1. For example, in a case that a matching motion estimation (frame rate up-conversion) mode of the merge mode is applied to the target block, the image coding apparatus 11 and the image decoding apparatus 31 perform motion search to determine the reference block. Thus, the reference blocks referenced by the target block are not known in advance. In this example, in a case that the matching motion estimation mode of the merge mode is applied to the target block, the MC filter parameter derivation unit 3039 sets a preset value of block_filter_idx to block_filter_idx of the target block.

Specifically, the motion compensation filter unit 30912 switches an MC filter to apply on the region to which the matching motion estimation mode is applied to a preset MC filter.

According to the above-described configuration, the region to which the matching motion estimation mode is applied can be processed using the preset filter. Specifically, the decoding can be omitted of the flag indicating the filter for the region to which the matching motion estimation mode is applied or the like.

Figure 18:
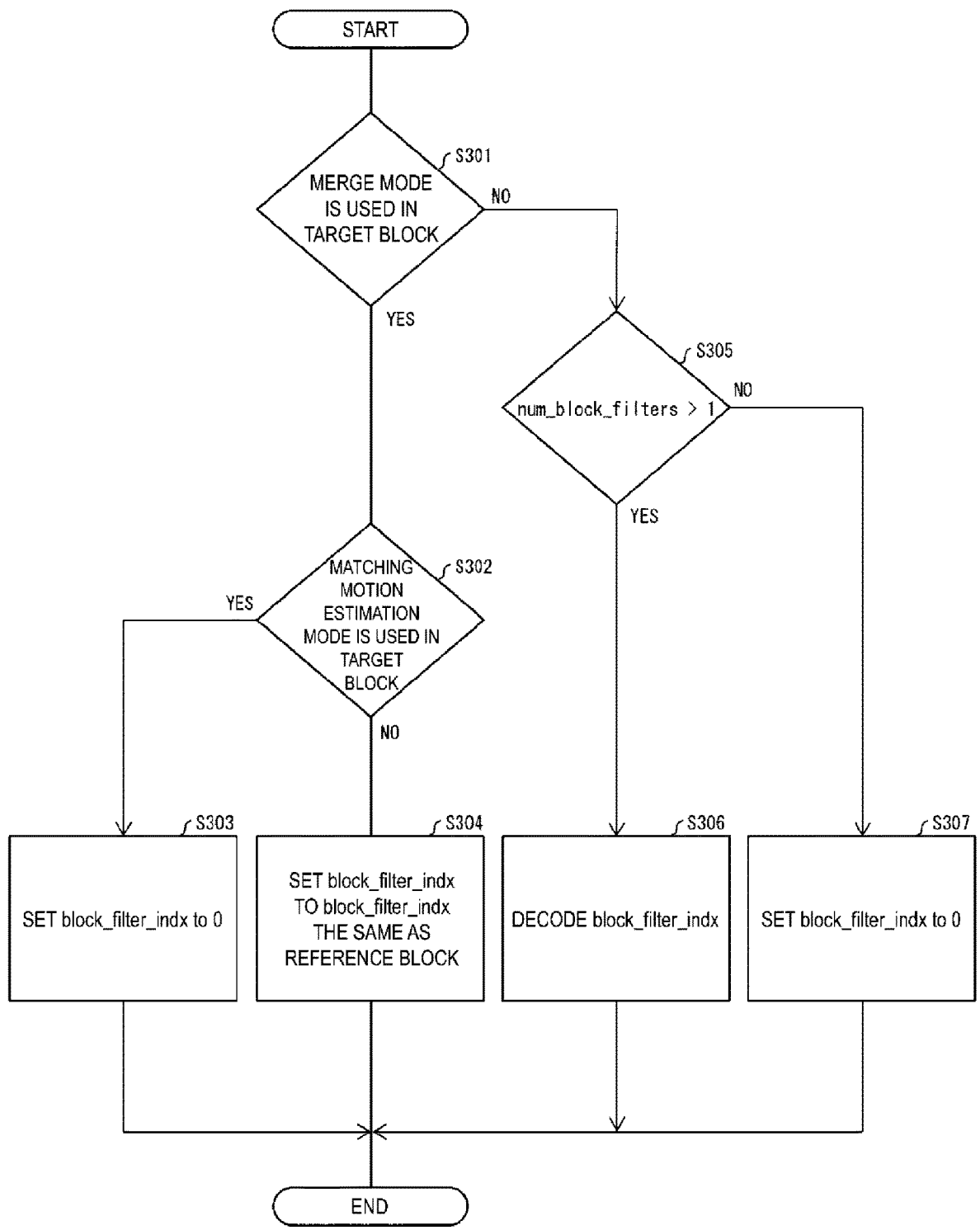
FIG. 18 is a flowchart illustrating another example of the operation of the filter index decoding process in the image decoding apparatus according to the present embodiment.

Next, an example of the process flow of the MC filter parameter derivation unit 3039 in this example will be described with reference to FIG. 18. FIG. 18 is a flowchart illustrating an example of the process flow of the MC filter parameter derivation unit 3039. As illustrated in FIG. 18, the MC filter parameter derivation unit 3039 references merge_flag to determine whether or not the merge mode is applied to the target block (S301). In a case that a merge mode is applied to the target block (YES at S301), the MC filter parameter derivation unit 3039 determines whether or not the matching motion estimation mode is applied to the target block with reference to fruc_mode_idx (S302). In a case that the matching motion estimation mode is applied to the target block (YES in S302), the MC filter parameter derivation unit 3039 sets block_filter_idx of the target block to block_filter_idx=0 (default value) (S303). Then, the process ends.

In a case that the matching motion estimation mode is not applied to the target block (NO in S302), the MC filter parameter derivation unit 3039 sets block_filter_idx of the reference block to block_filter_idx of the target block (S304). Then, the process ends.

In a case that the merge mode is not applied to the target block (NO in S301), the MC filter parameter derivation unit 3039 determines whether or not the number of MC filters NumBlockFilters is larger than 1 (S305). In a case that the number of MC filters NumBlockFilters is larger than 1 (YES in S305), the MC filter parameter derivation unit 3039 decodes block_filter_idx of the target block from the coded data (S306). Then, the process ends. Note that in a case that the number of MC filters NumBlockFilters is not larger than 1 (NO in S305), the MC filter parameter derivation unit 3039 sets block_filter_idx of the target block to block_filter_id=0 (S307). Then, the process ends.

Note that in a case that block_filter_idx of the target block cannot be acquired regardless of whether or not the matching motion estimation mode is applied to the target block, the MC filter parameter derivation unit 3039 may set block_filter_idx of the target block to block_filter_idx=0 (default value).

Example 4 of Identifying MC Filter Used in Each Block

Another example will be described in which the MC filter parameter derivation unit 3039 decodes only block_filter_idx that is applied to some of the blocks included in the target slice even in the case that the value of the number of MC filters NumBlockFilters is larger than 1. Here, as another example in which block_filter_idx is not decoded for each block, a case in which a motion vector MV in the target block is an integer value will be described. In a case that the motion vector MV is an integer value, interpolation of pixels by the MC filter is not required. Therefore, the MC filter is not required to be switched.

In this example, the inter prediction parameter decoder 303 first decodes the motion vector mvLX of the target block. Subsequently, the inter prediction parameter decoder 303 (or the motion compensation filter unit 30912) determines, using IsFullPelMV, whether or not the motion vector mvLX of the target block is an integer value. In a case that the motion vector mvLX is other than an integer value (in a case of IsFullPelMV=0), the inter prediction parameter decoder 303 (the MC filter parameter derivation unit 3039) decodes block_filter_idx of each block from the coded data. In a case that the motion vector mvLX is an integer value, the inter prediction parameter decoder 303 does not decode block_filter_idx from the coded data and sets to a prescribed value (e.g., 0). Note that, as described above, even in the case that the processed flag IsCuFilterCoded is 1, the following processing may be performed in a case that a specific mode (such as the merge mode) is applied to the target block. The inter prediction parameter decoder 303 does not decode but derives block_filter_idx from the coded data.

The motion vector mvLX has a horizontal mvLX[0] and a vertical direction mvLX[1]. Accordingly, the inter prediction parameter decoder 303 may derive a flag IsFullPelMV indicating whether or not the motion vector mvLX is an integer value by the following equation to determine the motion vector mvLX.

IsFullPelMV=!(mvLX[0] & (M−1)+(mvLX[1] & (M−1)))

Where "!" is an operation of changing 0 to non-0 and 0 to non-zero, and may be used for bit inversion or the like. Note that in a case that the accuracy of the motion vector mvLX is 1/M pixels, for example, in a case of ¼ pixel accuracy, M=4.

Note that in a case that multiple reference pictures are used for prediction of a target block such as a case that bi-prediction is applied to the target block (bipred, inter_pred_idc>0, predFlagL0>=0 && predFlagL1>=0), the inter prediction parameter decoder 303 may perform the following determinations. The inter prediction parameter decoder 303 determines whether or not all of the multiple motion vectors are integers (other than a case that any of the multiple motion vectors is other than an integer).

IsFullPelMV=!(((mvL0[0]& (M−1))+(mvL0[1]& (M−1))+(mvL1[1]&(M−1))+(mvL1[1]&(M−1)))

Modification of Example 5 of Identifying MC Filter Used in Each Block

The inter prediction parameter decoder 303 may determine whether the motion vector is an integer value using an IMV flag imv_flag that switches the accuracy of the motion vector. In a case that the IMV flag imv_flag is other than 0, the motion vector is only an integer value. Thus, the inter prediction parameter decoder 303 can omit the decoding of an interpolation filter block_filter_idx. Specifically, the inter prediction parameter decoder 303 decodes the IMV flag imv_flag. In the case that the IMV flag imv_flag is other than 0, the inter prediction parameter decoder 303 round the prediction vector mvpLX to an integer vector to derive a difference vector mvdLX of the integer vectors from the coded data. The inter prediction parameter decoder 303 derives the motion vector mvLX from a sum of the integer prediction vector and the difference vector of the integer vectors. The motion vector is an integer vector.

In a case that the IMV flag imv_flag is 0 (other than an integer vector), the inter prediction parameter decoder 303 decodes block_filter_idx from the coded data. In the case that the IMV flag imv_flag is 1, the inter prediction parameter decoder 303 (the MC filter parameter derivation unit 3039) does not decode block_filter_idx from the coded data but sets block_filter_idx to a prescribed value (e.g., 0).

Note that the decoding of the integer difference vector can be achieved by left-shifting the decoded intermediate value mvdLX by log 2(M) in the case that the IMV flag imv_flag is other than 0.

mvdLX[0]=mvdLX[0]<<log 2M mvdLX[1]=mvdLX[1]<<log 2M

Note that the formula for round processing to the integer vector described above is as follows, for example.

mvpLX[0]=mvpLX[0] & ~(M−1)

mvpLX[1]=mvpLX[1] & ~(M−1)

The rounding processing may be the following processing. Here, log 2M=log 2(M) holds.

mvpLX[0]=(mvpLX[0]>>log 2M)<<log 2M mvpLX[1]=(mvpLX[1]>>log 2M)<<log 2M

Note that the switching of the accuracy of the motion vector is not limited to switching to an integer vector (IMV flag imv_flag=1) or a fractional vector (IMV flag imv_flag=0). For example, the switching the accuracy of the motion vector may be switching to any of 4 pixel accuracy (IMV flag imv_flag=2), 1 pixel accuracy (IMV flag imv_flag=1), and a fractional vector (IMV flag imv_flag=0). This case can be also achieved by the above-described process. However, in the round processing in the case of the IMV flag imv_flag=2, the inter prediction parameter decoder 303 does not use the motion vector accuracy M but uses 4M as M used in rounding in the case of 4 pixel accuracy.

According to the above-described configuration, the inter prediction parameter decoder 303 switches the MC filter to apply on the block included in the target slice, only in the case that the motion vector is other than an integer. Specifically, the MC filter parameter derivation unit 3039 can omit the decoding of the flag indicating a filter for the block in the case that the motion vector is an integer, and the like.

Example 6 of Identifying MC Filter Used in Each Block

Another example will be described in which the MC filter parameter derivation unit 3039 decodes only block_filter_idx that is applied to some of the blocks included in the target slice even in the case that the value of the number of MC filters NumBlockFilters is larger than 1.

The motion compensation filter unit 30912 switches the MC filter as described below in a case of multiple MC filters selectable for the target block. The motion compensation filter unit 30912 decodes block_filter_idx only in a case that a block is initially processed in a CTU (switching unit for switching MC filter) (a first block), and uses the same block_filter_idx in the CTU in other case than the initial process (blocks other than the first block).

In other words, the motion compensation filter unit 30912 switches the filter to apply on the first region included in a certain unit as a filter to apply on a region different from the first region in the unit that includes the first region.

The MC filter parameter derivation unit 3039 decodes block_filter_idx of the block initially processed (the first block, the processed flag IsCuFilterCoded is 0) of the blocks in the CTU included in the target slice from the coded data. The MC filter parameter derivation unit 3039, after decoding block_filter_idx, sets the processed flag IsCuFilterCoded to 1. The MC filter parameter derivation unit 3039, in other case than the initial process (blocks other than the first block, the processed flag IsCuFilterCoded is 1), may not decode block_filter_id from the coded data but may set to block_filter_idx of the initially processed block (the first block). In other words, the MC filter parameter derivation unit 3039 sets the switching unit for switching the MC filter to a unit of CTU. The motion compensation filter unit 30912 references block_filter_idx to switch the MC filter, and performs the MC filter processing. Note that the block_filter_idx to be decoded may correspond to a block that is initially processed in a structure higher than the block unit. The structure higher than the block unit is not particularly limited to the CTU units, and a block larger than the prescribed size may be a higher structure.

An example of a syntax structure is as described in the following pseudo-code. In this example, the MC filter parameter derivation unit 3039 initializes the processed flag IsCuFilterCoded to zero in a case that a block size exceeds a prescribed size (Log 2MinCuFilterSize*2 in log size) in block partitioning. In each block, block_filter_idx is decoded only in the case that the processed flag IsCuFilterCoded is 1. Note that, as described above, even in the case that the processed flag IsCuFilterCoded is 1, the following processing may be performed in a case that a specific mode (such as the merge mode) is applied. The MC filter parameter derivation unit 3039 does not decode but derives block_filter_idx from the coded data.

Simplex Example in Block Partition

```
if (num_filters_minus1 && log2CbWidth + log2CbHeight >=
Log2MinCuFilterSize*2) {
    IsCuFilterCoded = 0
    block_filter_idx = 0
}
(Simplex example in each block)
if (num_filters_minus1 && !
IsCuFilterCoded) {
decode block_filter_idx
IsCuFilterCoded = 1
}
```

Where, log 2CbWidth and log 2CbHeight represent a width and a height of the block, respectively.

According to the above-described configuration, the motion compensation filter unit 30912 applies the MC filter to apply on the first block included in the target slice to a block different from the first block in the target slice. Specifically, the MC filter parameter derivation unit 3039 can omit the decoding of a flag indicating a filter for the block different from the first block, and the like.

Configuration of Image Coding Apparatus

Figure 4:
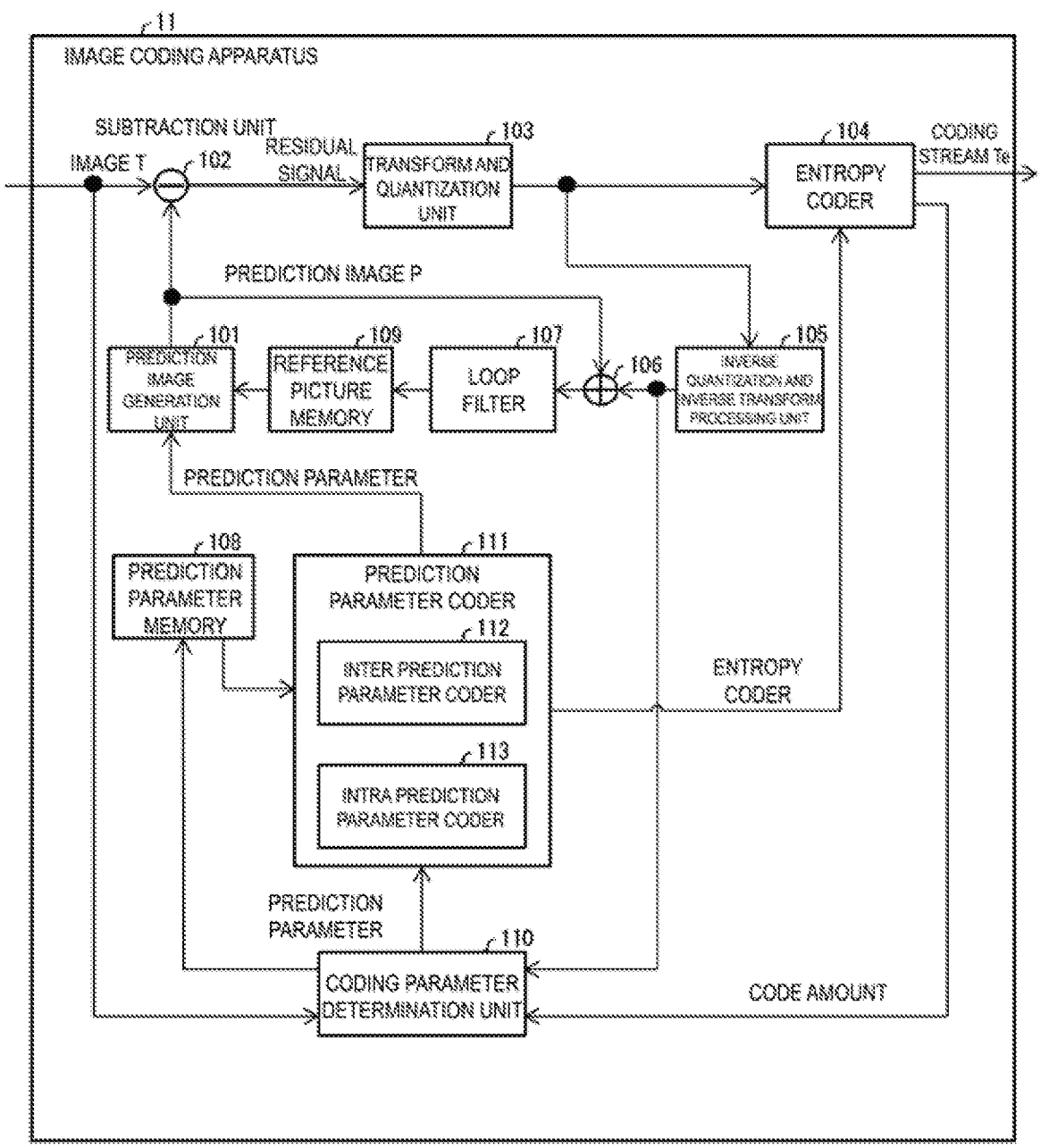
FIG. 4 is a block diagram illustrating a configuration of an image coding apparatus according to the present embodiment.

A configuration of the image coding apparatus 11 according to the present embodiment will now be described. FIG. 4 is a block diagram illustrating a configuration of the image coding apparatus 11 according to the present embodiment. The image coding apparatus 11 includes a prediction image generation unit 101, a subtraction unit 102, a transform and quantization unit 103, an entropy coder 104, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter coder 111. The prediction parameter coder 111 includes an inter prediction parameter coder 112 and an intra prediction parameter coder 113.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter coder 111. For example, in a case of the inter prediction, the prediction parameter input from the prediction parameter coder 111 is a motion vector. The prediction image generation unit 101 reads a block in a position in a reference image indicated by a motion vector starting from a target PU. In a case of the intra prediction, the prediction parameter is, for example, an intra prediction mode. The prediction image generation unit 101 reads a pixel value of an adjacent PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of a PU to the subtraction unit 102.

Figure 6:
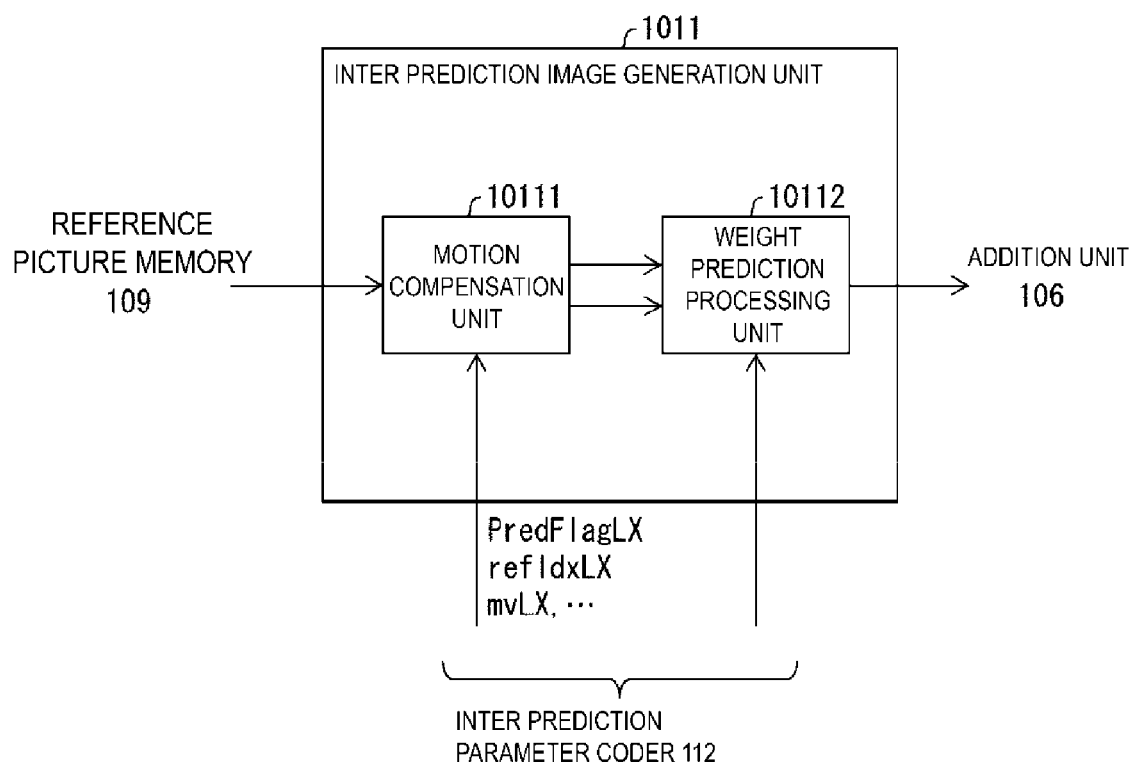
FIG. 6 is a schematic diagram illustrating a configuration of an inter prediction image generation unit of the image coding apparatus according to the present embodiment.

Note that the prediction image generation unit 101 is an operation same as the prediction image generation unit 308 already described. For example, FIG. 6 is a schematic diagram illustrating a configuration of an inter prediction image generation unit 1011 included in the prediction image generation unit 101. The inter prediction image generation unit 1011 includes a motion compensation unit 10111 and a weight prediction processing unit 10112. Descriptions about the motion compensation unit 10111 and the weight prediction processing unit 10112 are omitted since the motion compensation unit 10111 and the weight prediction processing unit 10112 have configurations similar to each of the above-mentioned motion compensation unit 3091 and weight prediction processing unit 3094, respectively.

The prediction image generation unit 101 generates the prediction image P of a PU, based on a pixel value of a reference block read from the reference picture memory, by using a parameter input by the prediction parameter coder. The prediction image generated by the prediction image generation unit 101 is output to the subtraction unit 102 and the addition unit 106.

The subtraction unit 102 subtracts a signal value of the prediction image P of a PU input from the prediction image generation unit 101 from a pixel value of a corresponding PU of the image T, and generates a residual signal. The subtraction unit 102 outputs the generated residual signal to the transform and quantization unit 103.

The transform and quantization unit 103 performs frequency transform on the residual signal input from the subtraction unit 102 to compute transform coefficients. The transform and quantization unit 103 quantizes the computed transform coefficients to find quantized coefficients. The transform and quantization unit 103 outputs the found quantized coefficients to the entropy coder 104 and the inverse quantization and inverse transform processing unit 105.

To the entropy coder 104, input are the quantized coefficients from the transform and quantization unit 103 and the coding parameters from the prediction parameter coder 111. For example, input coding parameters include codes such as a reference picture index refIdxLX, a prediction vector index mvp_LX_idx, a difference vector mvdLX, a prediction mode predMode, and a merge index merge_idx.

The entropy coder 104 performs entropy coding on the input quantization coefficients and coding parameters to generate the coding stream Te, and outputs the generated coding stream Te to the outside.

The inverse quantization and inverse transform processing unit 105 dequantizes the quantized coefficients input from the transform and quantization unit 103 to find transform coefficients. The inverse quantization and inverse transform processing unit 105 performs inverse frequency transform on the found transform coefficients to compute a residual signal. The inverse quantization and inverse transform processing unit 105 outputs the computed residual signal to the addition unit 106.

The addition unit 106 adds a signal value of the prediction image P of the PU input from the prediction image generation unit 101 and a signal value of the residual signal input from the inverse quantization and inverse transform processing unit 105 for each pixel to generate a decoded image. The addition unit 106 stores the generated decoded image in the reference picture memory 109.

The loop filter 107 performs a deblocking filter, a sample adaptive offset (SAO), and an adaptive loop filter (ALF) to the decoded image generated by the addition unit 106.

The prediction parameter memory 108 stores the prediction parameters generated by the coding parameter determination unit 110 for each picture and CU of the coding target in a prescribed position.

The reference picture memory 109 stores the decoded image generated by the loop filter 107 for each picture and CU of the coding target in a prescribed position.

The coding parameter determination unit 110 selects one set among multiple sets of coding parameters. A coding parameter is the above-mentioned prediction parameter or a parameter to be a target of coding generated associated with the prediction parameter. The prediction image generation unit 101 generates the prediction image P of the PUs by using each of the sets of these coding parameters.

The coding parameter determination unit 110 calculates cost values indicating a volume of an information quantity and coding errors for each of the multiple sets. For example, a cost value is a sum of a code amount and a value of multiplying a coefficient $\lambda$ by a square error. The code amount is an information quantity of the coding stream Te obtained by performing entropy coding on a quantization error and a coding parameter. The square error is a sum of pixels for square values of residual values of residual signals calculated in the subtraction unit 102. The coefficient $\lambda$ is a real number that is larger than a pre-configured zero. The coding parameter determination unit 110 selects a set of coding parameters by which the calculated cost value is minimized. With this configuration, the entropy coder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter coder 111 derives a format for coding from parameters input from the coding parameter determination unit 110, and outputs the format to the entropy coder 104. A derivation of a format for coding is, for example, to derive a difference vector from a motion vector and a prediction vector. The prediction parameter coder 111 derives parameters necessary to generate a prediction image from parameters input from the coding parameter determination unit 110, and outputs the parameters to the prediction image generation unit 101. For example, parameters necessary to generate a prediction image are a motion vector of a subblock unit.

The inter prediction parameter coder 112 derives inter prediction parameters such as a difference vector, based on prediction parameters input from the coding parameter determination unit 110. The inter prediction parameter coder 112 includes a partly identical configuration to a configuration by which the inter prediction parameter decoder 303 (see FIG. 5 and the like) derives inter prediction parameters, as a configuration to derive parameters necessary for generation of a prediction image output to the prediction image generation unit 101. A configuration of the inter prediction parameter coder 112 will be described later.

The intra prediction parameter coder 113 derives a format for coding (for example, MPM_idx, rem_intra_luma_pred_mode, and the like) from the intra prediction mode IntraPredMode input from the coding parameter determination unit 110.

Configuration of Inter Prediction Parameter Coder

Figure 10:
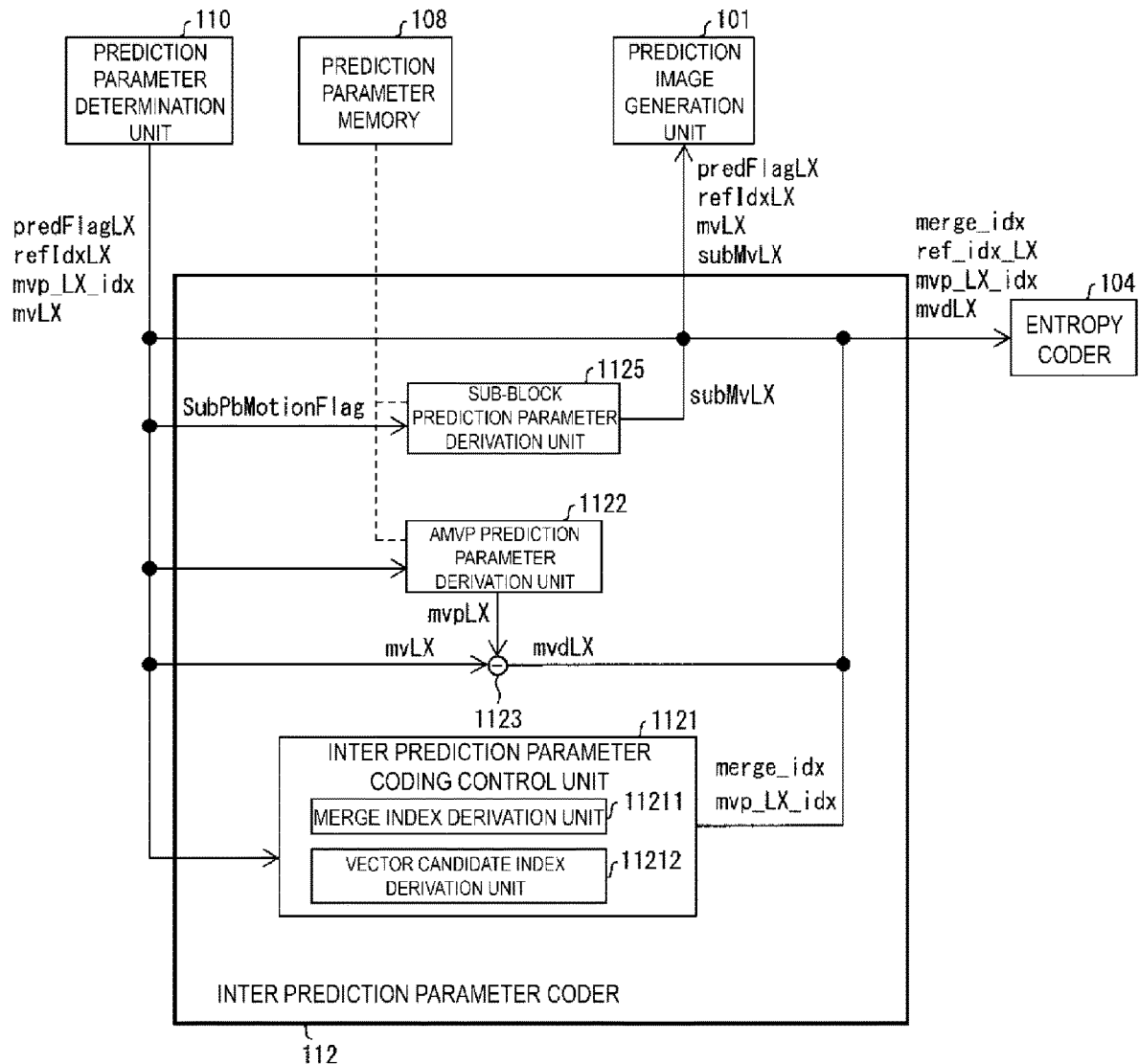
FIG. 10 is a schematic diagram illustrating a configuration of an inter prediction parameter coder in the image coding apparatus according to the present embodiment.

Next, a description is given of the configuration of the inter prediction parameter coder 112. The inter prediction parameter coder 112 is means corresponding to the inter prediction parameter decoder 303 in FIG. 12, and a configuration thereof is illustrated in FIG. 10.

The inter prediction parameter coder 112 is configured to include an inter prediction parameter coding control unit 1121, an AMVP prediction parameter derivation unit 1122, a subtraction unit 1123, a sub-block prediction parameter derivation unit 1125, and a partition mode derivation unit, merge flag derivation unit, inter prediction index derivation unit, reference picture index derivation unit, vector difference derivation unit and the like which are not illustrated in the figure. The partition mode derivation unit, the merge flag derivation unit, the inter prediction index derivation unit, the reference picture index derivation unit, and the vector difference derivation unit derive a PU partition mode part_mode, a merge flag merge_flag, an inter prediction index inter_pred_idc, a reference picture index refIdxLX, and a difference vector mvdLX, respectively. The inter prediction parameter coder 112 outputs a motion vector (mvLX, subMvLX), and the reference picture index refIdxLX, the PU partition mode part_mode, the inter prediction index inter_pred_idc, or information indicating these to the prediction image generation unit 101. The inter prediction parameter coder 112 outputs the PU partition mode part_mode, the merge flag merge_flag, the merge index merge_idx, the inter prediction index inter_pred_idc, the reference picture index refIdxLX, the prediction vector index mvp_LX_idx, the difference vector mvdLX, and the sub-block prediction mode flag subPbMotionFlag to the entropy coder 104.

The inter prediction parameter coding control unit 1121 includes a merge index derivation unit 11211 and a vector candidate index derivation unit 11212. The merge index derivation unit 11211 compares the motion vector and reference picture index which are input from the coding parameter determination unit 110 with the motion vector and reference picture index of a PU for a merge candidate read from the prediction parameter memory 108 to derive the merge index merge_idx, and outputs the derived merge index to the entropy coder 104. The merge candidate is a reference PU in a predefined range from the coding target CU which is to be coded (e.g., a reference PU adjoining a lower left end, upper left end, or upper right end of the coding target block), and is a PU on which the coding process is completed. The vector candidate index derivation unit 11212 derives the prediction vector index mvp_LX_idx.

The sub-block prediction parameter derivation unit 1125 derives the motion vector and reference picture index of any sub-block prediction of spatial sub-block prediction, temporal sub-block prediction, affine prediction, and matching motion derivation according to a value of subPbMotionFlag, in a case that the coding parameter determination unit 110 determines to use the sub-block prediction mode. The motion vector and the reference picture index reads out and derives the motion vector or reference picture index of the adjacent PU, the reference picture block, and the like from the prediction parameter memory 108 as described in the description of the image decoding apparatus.

The AMVP prediction parameter derivation unit 1122 has a configuration similar to the AMVP prediction parameter derivation unit 3032 described above (see FIG. 12).

Specifically, in the case that the prediction mode predMode indicates the inter prediction mode, the motion vector mvLX is input to the AMVP prediction parameter derivation unit 1122 from the coding parameter determination unit 110.

The AMVP prediction parameter derivation unit 1122 derives a prediction vector mvpLX based on the input motion vector mvLX. The AMVP prediction parameter derivation unit 1122 outputs the derived prediction vector mvpLX to the subtraction unit 1123. The reference picture index refIdx and the prediction vector index mvp_LX_idx are output to the entropy coder 104.

The configuration for deriving parameters necessary for generation of a prediction image output to the prediction image generation unit 101 in the inter prediction parameter coder 112 may be similar to the configuration for deriving the inter prediction parameters by the MC filter parameter derivation unit 3039 (see FIG. 12 and the like).

The subtraction unit 1123 subtracts the prediction vector mvpLX input from the AMVP prediction parameter derivation unit 1122 from the motion vector mvLX input from the coding parameter determination unit 110 to generate a difference vector mvdLX. The difference vector mvdLX is output to the entropy coder 104.

Note that a part of the image coding apparatus 11 and image decoding apparatus 31 in the embodiments described above, for example, the entropy decoder 301, the prediction parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the prediction parameter coder 111 may be implemented by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image coding apparatus 11 or the image decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiments and various amendments can be made to a design that fall within the scope that does not depart from the gist of the disclosure.

Application Examples

The above-mentioned image coding apparatus 11 and the image decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

Figure 19:
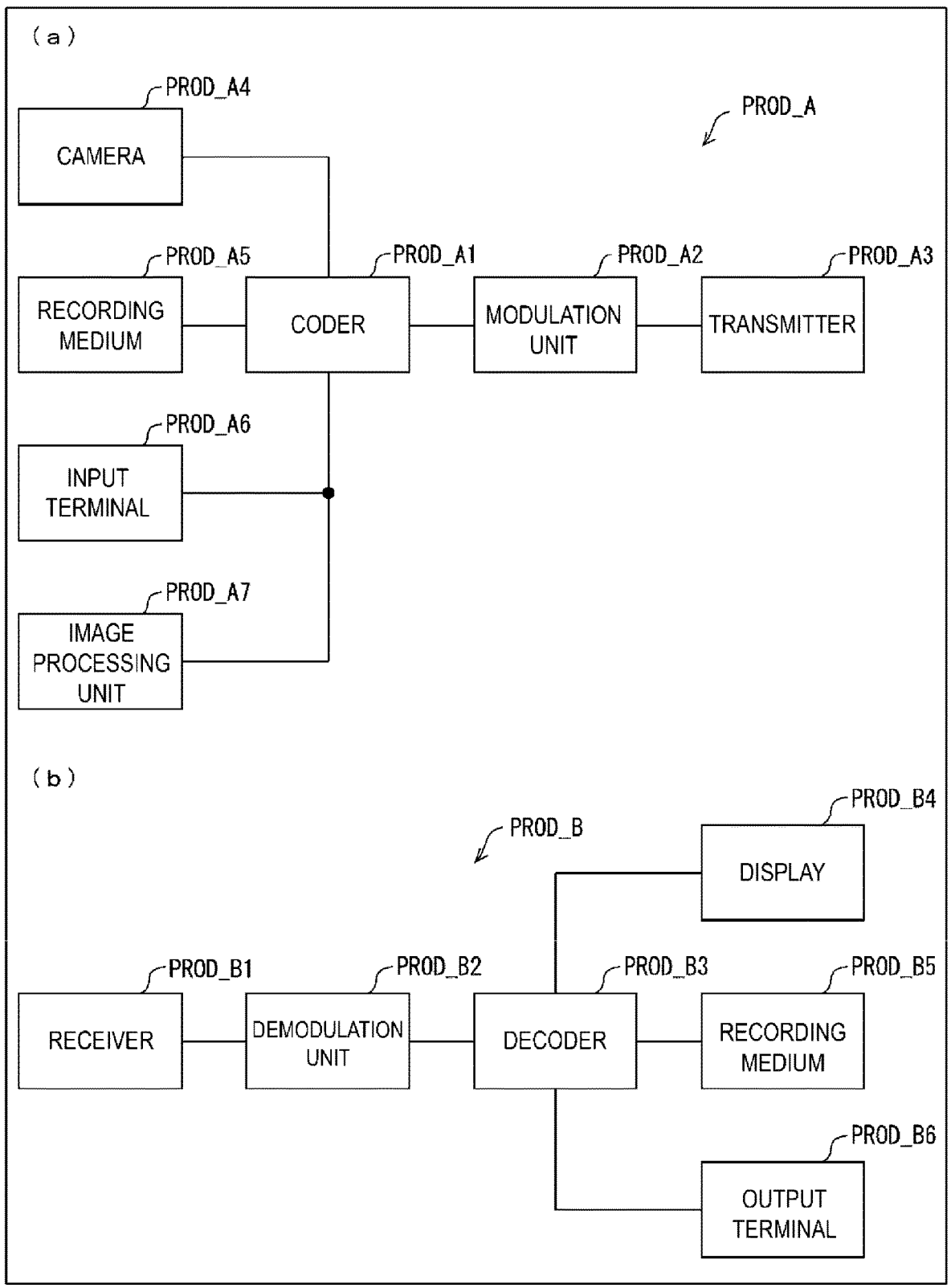
FIG. 19 is a diagram illustrating configurations of a transmitting apparatus equipped with the image coding apparatus and a receiving apparatus equipped with the image decoding apparatus according to present embodiment. (a) illustrates the transmitting apparatus equipped with the image coding apparatus, and (b) illustrates the receiving apparatus equipped with the image decoding apparatus.

First, a description is given of that the image coding apparatus 11 and the image decoding apparatus 31 described above can be used to receive and transmit the video with reference to FIG. 19.

(a) of FIG. 19 is a block diagram illustrating a configuration of a transmitting apparatus PROD_A equipped with the image coding apparatus 11. As illustrated in (a) of FIG. 19, the transmitting apparatus PROD_A includes an coder PROD_A1 that codes a video to acquire coded data, a modulation unit PROD_A2 that modulates a carrier wave by using the coded data acquired by the coder PROD_A1 to acquire a modulated signal, and a transmitter PROD_A3 that transmits the modulated signal acquired by the modulation unit PROD_A2. The above-mentioned image coding apparatus 11 is utilized as the coder PROD_A1.

The transmitting apparatus PROD_A may further include a camera PROD_A4 that images videos, a recording medium PROD_A5 that records videos, an input terminal PROD_A6 that inputs videos from the outside, and an image processing unit A7 that generates or processes images, as supply sources of the videos input into the coder PROD_A1. In (a) of FIG. 19, although the configuration that the transmitting apparatus PROD_A includes these all is exemplified, a part may be omitted.

Note that the recording medium PROD_A5 may record videos which are not coded, or may record videos coded in a coding scheme for recording different than a coding scheme for transmission. In the latter case, a decoder (not illustrated) to decode coded data read from the recording medium PROD_A5 according to coding scheme for recording may be interleaved between the recording medium PROD_A5 and the coder PROD_A1.

(b) of FIG. 19 is a block diagram illustrating a configuration of a receiving apparatus PROD_B equipped with the image decoding apparatus 31. As illustrated in (b) of FIG. 19, the receiving apparatus PROD_B includes a receiver PROD_B1 that receives modulation signals, a demodulation unit PROD_B2 that demodulates the modulated signals received by the receiver PROD_B1 to acquire coded data, and a decoder PROD_B3 that decodes the coded data acquired by the demodulation unit PROD_B2 to acquire a video. The above-mentioned image decoding apparatus 31 is utilized as the decoder PROD_B3.

The receiving apparatus PROD_B may further include a display PROD_B4 that displays videos, a recording medium PROD_B5 to record the videos, and an output terminal PROD_B6 to output videos outside, as supply destinations of the videos output by the decoder PROD_B3. In (b) of FIG. 19, although the configuration that the receiving apparatus PROD_B includes these all is exemplified, a part may be omitted.

Note that the recording medium PROD_B5 may record videos which are not coded, or may record videos which are coded in a coding scheme for recording different from a coding scheme for transmission. In the latter case, an coder (not illustrated) to code videos acquired from the decoder PROD_B3 according to a coding scheme for recording may be interleaved between the decoder PROD_B3 and the recording medium PROD_B5.

Note that the transmission medium transmitting modulation signals may be wireless or may be wired. The transmission aspect to transmit modulation signals may be broadcasting (here, referred to as the transmission aspect where the transmission target is not specified beforehand) or may be telecommunication (here, referred to as the transmission aspect that the transmission target is specified beforehand). Thus, the transmission of the modulation signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting are examples of transmitting apparatus PROD_A/receiving apparatus PROD_B transmitting and/or receiving modulation signals in radio broadcasting. Broadcasting stations (broadcasting equipment, and the like)/receiving stations (television receivers, and the like) of cable television broadcasting are examples of transmitting apparatus PROD_A/receiving apparatus PROD_B transmitting and/or receiving modulation signals in cable broadcasting.

Servers (work stations, and the like) for Video On Demand (VOD) services or video hosting services using the Internet and the like/clients (television receivers, personal computers, smartphones, and the like) are examples of transmitting apparatus PROD_A/receiving apparatus PROD_B transmitting and/or receiving modulation signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multifunctional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmitting apparatus PROD_A and the receiving apparatus PROD_B.

Figure 20:
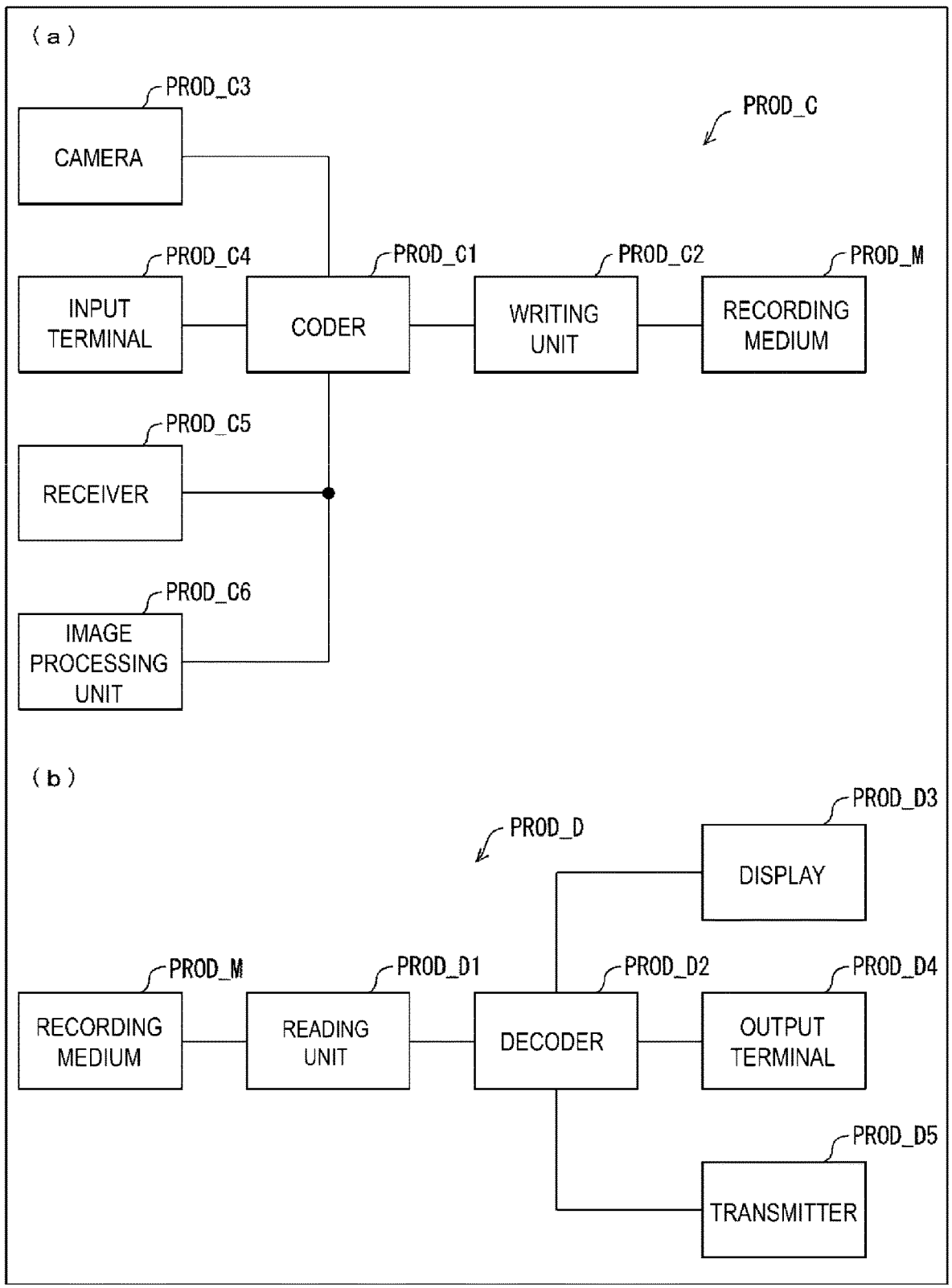
FIG. 20 is a diagram illustrating configurations of a recording device equipped with the image coding apparatus and a reconstruction apparatus equipped with the image decoding apparatus according to present embodiment. (a) illustrates the recording apparatus equipped with the image coding apparatus, and (b) illustrates the reconstruction apparatus equipped with the image decoding apparatus.

Next, a description is given of that the image coding apparatus 11 and the image decoding apparatus 31 described above can be used to record and reproduce the video with reference to FIG. 20.

(a) of FIG. 20 is a block diagram illustrating a configuration of a recording apparatus PROD_C equipped with the image coding apparatus 11 described above. As illustrated in (a) of FIG. 20, the recording apparatus PROD_C includes an coder PROD_C1 that codes a video to acquire coded data, and a writing unit PROD_C2 that writes the coded data acquired by the coder PROD_C1 in a recording medium PROD_M. The above-mentioned image coding apparatus 11 is utilized as the coder PROD_C1.

Note that the recording medium PROD_M may be (1) a type built in the recording apparatus PROD_C such as Hard Disk Drive (HDD) or Solid State Drive (SSD), (2) a type connected to the recording apparatus PROD_C such as an SD memory card or a Universal Serial Bus (USB) flash memory, or (3) a type loaded in a drive device (not illustrated) built in the recording apparatus PROD_C such as Digital Versatile Disc (DVD) or Blu-ray Disc (BD: trade name).

The recording apparatus PROD_C may further include a camera PROD_C3 that images videos, an input terminal PROD_C4 to input videos from the outside, a receiver PROD_C5 to receive videos, and an image processing unit PROD_C6 that generates or processes images, as supply sources of the videos input into the coder PROD_C1. In (a) of FIG. 20, although the configuration that the recording apparatus PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoder (not illustrated) for transmission to decode coded data coded in a coding scheme for transmission may be interleaved between the receiver PROD_C5 and the coder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main supply source of the videos). A camcorder (in this case, the camera PROD_C3 is the main supply source of the videos), a personal computer (in this case, the receiver PROD_C5 or the image processing unit C6 is the main supply source of the videos), a smartphone (in this case, the camera PROD_C3 or the receiver PROD_C5 is the main supply source of the videos), or the like is an example of such recording apparatus PROD_C.

(b) of FIG. 20 is a block diagram illustrating a configuration of a reconstruction apparatus PROD_D equipped with the image decoding apparatus 31. As illustrated in (b) of FIG. 20, the reconstruction apparatus PROD_D includes a reading unit PROD_D1 that reads coded data written into the recording medium PROD_M, and a decoder PROD_D2 that decodes the coded data read by the reading unit PROD_D1 to acquire a video. The above-mentioned image decoding apparatus 31 is utilized as the decoder PROD_D2.

Note that the recording medium PROD_M may be (1) a type built in the reconstruction apparatus PROD_D such as an HDD and an SSD, (2) a type connected to the reconstruction apparatus PROD_D such as an SD memory card and a USB flash memory, or (3) a type loaded into a drive device (not illustrated) built in the reconstruction apparatus PROD_D such as a DVD and a BD.

The reconstruction apparatus PROD_D may further include a display PROD_D3 that displays videos, an output terminal PROD_D4 to output videos to the outside, and a transmitter PROD_D5 that transmits videos, as supply destinations of the videos output by the decoder PROD_D2. In (b) of FIG. 20, although the configuration that the reconstruction apparatus PROD_D includes these all is exemplified, a part may be omitted.

Note that the transmitter PROD_D5 may transmit a video which is not coded, or may transmit coded data coded in a coding scheme for transmission different than a coding scheme for recording. In the latter case, an coder (not illustrated) to code a video in a coding scheme for transmission may be interleaved between the decoder PROD_D2 and the transmitter PROD_D5.

Examples of such reconstruction apparatus PROD_D include a DVD player, a BD player, an HDD player, and the like (in this case, the output terminal PROD_D4 to which a television receiver, and the like is connected is the main supply destination of the video). A television receiver (in this case, the display PROD_D3 is the main supply destination of the videos), a digital signage (also referred to as an electronic signboard or an electronic bulletin board, and the like, the display PROD_D3 or the transmitter PROD_D5 is the main supply destination of the videos), a desktop PC (in this case, the output terminal PROD_D4 or the transmitter PROD_D5 is the main supply destination of the videos), a laptop type or graphics tablet type PC (in this case, the display PROD_D3 or the transmitter PROD_D5 is the main supply destination of the videos), a smartphone (in this case, the display PROD_D3 or the transmitter PROD_D5 is the main supply destination of the videos), or the like is an example of such reconstruction apparatus PROD_D.

Realization as Hardware and Realization as Software

Each block of the above-mentioned image decoding apparatus 31 and the image coding apparatus 11 may be realized as a hardware by a logical circuit formed on an integrated circuit (IC chip), or may be realized as a software using a Central Processing Unit (CPU).

In the latter case, the above-described apparatuses include a CPU to execute commands of a program for achieving the functions, a Read Only Memory (ROM) to store the program, a Random Access Memory (RAM) to load the program, and a storage device (recording medium) such as a memory to store the program and various types of data. The purpose of the embodiments of the disclosure can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured to be connectible with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE)

1394, a USB, a power line carrier, a cable TV line, a phone line, an Asymmetric Digital Subscriber Line (ADSL) line, and a radio communication such as infrared ray such as Infrared Data Association (IrDA) or a remote control, Bluetooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the disclosure can be also realized in the form of computer data signals embedded in a carrier wave where the program code is embodied by electronic transmission.

The embodiments of the disclosure are not limited to the above-mentioned embodiments, and various modifications are possible within the scope of the claims. Thus, embodiments obtained by combining technical means modified appropriately within the scope defined by claims are included in the technical scope of the disclosure.

The disclosure is not limited to each of the above-described embodiments. It is possible to make various modifications within the scope of the claims. An embodiment obtained by appropriately combining technical elements each disclosed in different embodiments falls also within the technical scope of the disclosure. Further, in a case that technical elements disclosed in the respective embodiments are combined, it is possible to form a new technical feature.

CROSS-REFERENCE OF RELATED APPLICATION

This application claims the benefit of priority to JP 2017-189062 filed on Sep. 28, 2017, which is incorporated herein by reference in its entirety.

INDUSTRIAL APPLICABILITY

The embodiments of the disclosure can be preferably applied to an image decoding apparatus to decode coded data where graphics data is coded, and an image coding apparatus to generate coded data where graphics data is coded. The embodiments of the disclosure can be preferably applied to a data structure of coded data generated by the image coding apparatus and referred to by the image decoding apparatus.

REFERENCE SIGNS LIST

11 . . . Image coding apparatus (video coding apparatus)
31 . . . Image decoding apparatus (video decoding apparatus)
313 . . . Motion compensation filter apparatus
3039 . . . MC filter parameter derivation unit (filter switching unit selection unit)
30912 . . . Motion compensation filter unit (filter switching processing unit)

The invention claimed is:

1. A motion compensation filter apparatus for applying a filter on a pixel value of a full sample image at an integer pixel position and calculating a pixel value at a fractional pixel position, to generate a filtered image, the motion compensation filter apparatus comprising:
a filter switching processing unit configured to switch one of a number of filters filter to apply the filter on the full sample image in a certain unit, wherein the filter switching processing unit switches the filter to apply on a prediction region to a filter used for a reference region of the prediction region when a merge prediction mode is applied to the prediction region; and
a filter switching unit selection unit configured to select a switching unit for filter switching by the filter switching processing unit.

2. The motion compensation filter apparatus according to claim 1, wherein:
the filter switching unit selection unit selects the switching unit for the filter switching in accordance with a picture type of a target image;
the picture type of the target image is determined as one of a reference image and a non-reference image;
the picture type of the target image is the reference image when the targe image is referenced from subsequent images; and
the picture type of the target image is the non-reference image when the targe image is not referenced from subsequent images.

3. The motion compensation filter apparatus according to claim 1, wherein the filter switching unit selection unit selects the switching unit for the filter switching in accordance with the number of the filters selectable for the certain unit.

4. The motion compensation filter apparatus according to claim 3, wherein the filter switching processing unit generates a filter coefficient of the filter to apply on the full sample image from a linear sum calculated from a prescribed number of motion compensation coefficients and weight coefficients.

5. The motion compensation filter apparatus according to claim 1,
wherein the filter switching processing unit switches the filter to apply on the prediction region to a filter that is preconfigured when a matching motion estimation mode is applied to the prediction region.

6. The motion compensation filter apparatus according to claim 1,
wherein the filter switching processing unit switches the filter to apply on the prediction region in the certain unit to a filter that is used for a first region included in the certain unit and is different from a filter that is used for the prediction region when the a number of the filters selectable for the certain unit is greater than one.

7. An image decoding apparatus comprising:
the motion compensation filter apparatus according to claim 1,
wherein the image decoding apparatus causes the filter to generate a prediction image, and adds a residue image to or subtracts a residue image to or from the prediction image to reconstruct a coding target image.

8. A video coding apparatus comprising:
the motion compensation filter apparatus according to claim 1,
wherein the video coding apparatus causes the filter to generate a prediction image, and codes a residual between the prediction image and a coding target image.

9. The motion compensation filter apparatus according to claim 1, wherein the filter switching processing unit sets a block filter index of the prediction region to a reference filter index of the reference region when the merge prediction mode is applied to the prediction region.

10. The motion compensation filter apparatus according to claim 9, wherein the filter switching processing unit determines the block filter index without decoding the block filter index using coded data of the prediction region when the merge prediction mode is applied to the prediction region.

11. The motion compensation filter apparatus according to claim 9, wherein the reference filter index of the reference region is designated by a merge index from a plurality of merge candidates derived for the prediction region.

* * * * *